(12) United States Patent
Baek et al.

(10) Patent No.: US 12,200,581 B2
(45) Date of Patent: Jan. 14, 2025

(54) POSITIONING METHOD IN WIRELESS COMMUNICATION SYSTEM, AND DEVICE THEREFOR

(71) Applicant: LG Electronics Inc., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/773,752

(22) PCT Filed: Nov. 16, 2020

(86) PCT No.: PCT/KR2020/016072
§ 371 (c)(1),
(2) Date: May 2, 2022

(87) PCT Pub. No.: WO2021/096322
PCT Pub. Date: May 20, 2021

(65) Prior Publication Data
US 2022/0386093 A1 Dec. 1, 2022

(30) Foreign Application Priority Data

Nov. 15, 2019 (KR) .......................... 10-2019-0146342

(51) Int. Cl.
*H04W 4/40* (2018.01)
*H04W 24/02* (2009.01)
(Continued)

(52) U.S. Cl.
CPC ............ *H04W 4/40* (2018.02); *H04W 24/02* (2013.01); *H04W 24/10* (2013.01); *H04W 36/0085* (2018.08)

(58) Field of Classification Search
None
See application file for complete search history.

(56) References Cited

U.S. PATENT DOCUMENTS 10,462,015 B1 * 10/2019 Henry ..................... H04L 43/50
2017/0367067 A1   12/2017 Hwang et al.
(Continued)

FOREIGN PATENT DOCUMENTS

JP        2017118462 A    6/2017
KR         101448977 B1  10/2014
(Continued)

*Primary Examiner* — Kenneth B Wells
(74) *Attorney, Agent, or Firm* — BRYAN CAVE LEIGHTON PAISNER LLP

(57) ABSTRACT

The present disclosure relates to a sidelink positioning method in a vehicle equipped with a distributed antenna, and a device therefor. A sidelink positioning method in a user equipment (UE) of a positioning vehicle equipped with a distributed antenna according to one aspect may comprise the steps of: performing a preliminary operation for sidelink positioning to select a nearby vehicle which is to participate in the positioning; exchanging, with the selected nearby vehicle, sidelink control information for the positioning; reselecting an antenna group, which is to participate in the positioning, on the basis of a signal received from the selected nearby vehicle; and performing the positioning using the reselected antenna group. The UE is capable of communicating with at least one of another UE, a UE related to an autonomous driving vehicle, a base station (BS) or a network.

18 Claims, 21 Drawing Sheets

(51) Int. Cl.
*H04W 24/10* (2009.01)
*H04W 36/00* (2009.01)

(56) References Cited

U.S. PATENT DOCUMENTS

2022/0330038 A1* 10/2022 Ganesan ............. H04W 72/046
2024/0069148 A1* 2/2024 Baek ......................... G01S 5/14

FOREIGN PATENT DOCUMENTS

| KR | 10-2019-0108121 A | 8/2019 |
| KR | 10-2019-0099271 A | 9/2019 |
| WO | 2016013852 A1 | 1/2016 |
| WO | 2017023474 A1 | 2/2017 |

* cited by examiner (a)

(b)

POSITIONING METHOD IN WIRELESS COMMUNICATION SYSTEM, AND DEVICE THEREFOR

This application is the National Stage filing under 35 U.S.C. 371 of International Application No. PCT/KR2020/016072 filed on Nov. 16, 2020, which claims priority to Korean Patent Application No. 10-2019-0146342 filed on Nov. 15, 2019, the contents of which are all hereby incorporated by reference herein in their entirety.

TECHNICAL FIELD

The present disclosure relates to a positioning method in a wireless communication system and an apparatus therefor and, more particularly, to a positioning technique based on a user equipment or a network in a sidelink vehicle-to-everything (V2X) system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and multi carrier frequency division multiple access (MC-FDMA) system, etc.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

Meanwhile, since positioning in a legacy LTE/NR system considers only mobile UEs each equipped with a single antenna of a limited size or multiple antennas installed integrally, such as smartphones and Internet of things (IoT) devices, based on measurement of a downlink time difference of arrival (DL-TDoA) (or observed time difference of arrival (OTDoA)), this is not suitable for positioning of a vehicle.

For positioning of a UE using OTDoA of the legacy NR system, a method has been used in which a location server, a location management function (LMF), and/or an anchor node (AN) requests the UE to measure a reference signal time difference (RSTD) necessary for positioning of the OTDoA and report information about the RSTD, and a network measures the location of the UE using the received RSTD and then transmits location information back to the UE.

Positioning in the legacy LTE/NR system has considered only mobile UEs each equipped with a single antenna of a limited size or multiple antennas installed integrally, such as smartphones and IoT devices, based on measurement of the DL-TDoA (or OTDoA), so that it is not suitable for positioning of a vehicle.

This positioning method based on the network may cause large latency until the UE finally receives location information, thereby deteriorating reliability of information. In particular, physical latency occurring in such a positioning operation is problematic in that reliability of the location information is remarkably deteriorated as the speed of the UE in an NR-V2X system increases.

DISCLOSURE

Technical Problem

An object to be solved is to provide a sidelink positioning method using distributed antennas in an NR-V2X system, and an apparatus therefor.

Another object to be solved is to provide a sidelink positioning method which provides fast link connection between a positioning vehicle and a neighbor vehicle by performing sidelink positioning through a non-negotiation method between vehicles and is effectively applicable to a distributed network environment in which the movement speed of a vehicle is fast, and an apparatus therefor.

Another object to be solved is to provide a sidelink positioning method of rapidly improving the link quality of a vehicle network without affecting sidelink positioning which is being performed by changing an antenna group using the same request/response ID, and an apparatus therefor.

Another object to be solved is to provide a sidelink positioning method of improving efficiency and flexibility of a sidelink positioning operation between distributed antenna vehicles by providing an adaptive antenna group selection and antenna group change method in consideration of a channel congestion level in a distributed antenna vehicle using a plurality of antenna groups, a PRS resource status, and link quality of a vehicle network, and an apparatus therefor.

Another object to be solved is to provide a sidelink positioning method of minimizing the cost of infrastructure installation for positioning by providing an absolute positioning method using a relative position for sidelink positioning between distributed antenna vehicles.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect, provided herein is a sidelink positioning method in a positioning vehicle equipped with distributed antennas, including selecting a neighbor vehicle which is to participate in positioning by performing a preliminary operation for sidelink positioning, exchanging sidelink control information for positioning with the selected neighbor vehicle, reselecting an antenna group which is to participate in positioning based on a signal received from the selected neighbor vehicle, and performing positioning using the reselected antenna group.

The reselecting the antenna group may include transmitting a request positioning reference signal (PRS) by selecting a request PRS identification (ID), receiving a response PRS in response to the request PRS; measuring signal quality of the received response PRS, and reselecting the antenna group which is to participate in positioning based on the measured signal quality.

The reselecting the antenna group may further include measuring an angle of arrival (AoA) using the received response PRS, and the antenna group which is to participate in positioning may be reselected based further on the measured AoA.

Positioning topology between the positioning vehicle and the neighbor vehicle may be determined based on the measured AoA, and the antenna group which is to participate in positioning may be reselected based on the determined positioning topology.

The method may further include requesting the neighbor vehicle to reselect the antenna group which is to participate in positioning, based on degradation or non-degradation of positioning performance according to the determined positioning topology.

The reselecting the antenna group may further include measuring link quality of the antenna group based on the signal received from the neighbor vehicle, comparing the link quality of the antenna group with a predetermined threshold, and adjusting the number of antenna groups to participating in positioning according to a result of the comparison.

The reselecting the antenna group may further include calculating a congestion level of channel resource use based on the number of neighbor vehicles which are participating in positioning, and determining whether the antenna group needs to be reselected based on the calculated congestion level and positioning performance demanded by a higher layer.

The method may further include receiving a measurement reporting signal from the selected neighbor vehicle. The antenna group which is to participate in positioning may be reselected based further on the measurement reporting signal, and the measurement reporting signal may include at least one of information about a time difference between a reception time of the request PRS and a transmission time of the response PRS for each antenna group participating in positioning of the neighbor vehicle, information about an angle of arrival (AoA) corresponding to the request PRS, or information about link quality corresponding to the request PRS.

The reselecting the antenna group may include receiving a signal requesting reselection of the antenna group from the neighbor vehicle, and reselecting the antenna group based on the signal requesting reselection.

The method may further include transmitting a result of the reselection of the antenna group to the neighbor vehicle, and receiving information about the antenna group reselected by the neighbor vehicle from the neighbor vehicle.

The sidelink control information for positioning may include at least one of information related to reservation of a resource for PRS transmission, information related to the number and locations of antenna groups participating in positioning, or indicator information indicating whether the antenna group which is to participate in positioning needs to be reselected/configured.

In another aspect, provided herein is an apparatus for performing sidelink positioning in a wireless communication system, including a radio frequency (RF) transceiver including a plurality of distributed antennas, and a processor connected to the RF transceiver. The processor may select a neighbor vehicle which is to participate in positioning by performing a preliminary operation for sidelink positioning, exchange sidelink control information for positioning with the selected neighbor vehicle, reselect an antenna group which is to participate in positioning based on a signal received from the selected neighbor vehicle, and perform positioning using the reselected antenna group.

The processor may transmit a request positioning reference signal (PRS) by selecting a request PRS identification (ID), receive a response PRS in response to the request PRS, measure quality of the received response PRS, and reselect the antenna group which is to participate in positioning based on the measured quality.

The processor may measure an angle of arrival (AoA) using the received response PRS and reselect the antenna group which is to participate in positioning based further on the measured AoA.

The processor may determine positioning topology between the positioning vehicle and the neighbor vehicle based on the measured AoA and reselects the antenna group which is to participate in positioning based on the determined positioning topology.

Based on degradation or non-degradation of positioning performance according to the determined positioning topology, the processor may request the neighbor vehicle to reselect the antenna group which is to participate in positioning.

The sidelink control information for positioning may include at least one of information related to reservation of a resource for PRS transmission, information related to the number and locations of antenna groups participating in positioning, or indicator information indicating whether the antenna group which is to participate in positioning needs to be reselected/configured.

The processor may measure link quality of the antenna group based on the signal received from the neighbor vehicle, compare the link quality of the antenna group with a predetermined threshold, and adjusts the number of antenna groups which are to participate in positioning according to a result of the comparison.

The processor may calculate a congestion level of channel resource use based on the number of neighbor vehicles which are participating in positioning and determine whether the antenna group needs to be reselected based on the calculated congestion level and positioning performance demanded by a higher layer.

The processor may reselect, based on reception of a measurement reporting signal from the selected neighbor vehicle, the antenna group which is to participate in positioning based further on the measurement reporting signal, and the measurement reporting signal may include at least one of information about a time difference between a reception time of the request PRS and a transmission time of the response PRS for each antenna group participating in positioning of the neighbor vehicle, information about an angle of arrival (AoA) corresponding to the request PRS, or information about link quality corresponding to the request PRS.

The processor may reselect the antenna group based on reception of a signal requesting reselection of the antenna group from the neighbor vehicle.

The processor may transmit a result of the reselection of the antenna group to the neighbor vehicle and receive information about the antenna group reselected by the neighbor vehicle from the neighbor vehicle.

Advantageous Effects

Various embodiments may provide a sidelink positioning method using distributed antennas in an NR-V2X system and an apparatus therefor.

Various embodiments may provide fast link connection between a positioning vehicle and a neighbor vehicle by performing sidelink positioning through a non-negotiation method between vehicles and may be effectively applied to a distributed network environment in which the movement speed of a vehicle is fast.

Various embodiments may rapidly improve the link quality of a vehicle network without affecting sidelink positioning which is being performed by changing an antenna group using the same request/response ID.

Various embodiments may improve efficiency and flexibility of a sidelink positioning operation between distributed antenna vehicles by providing an adaptive antenna group selection and antenna group change method in consideration of a channel congestion level, a positioning reference signal (PRS) resource status, and link quality of a vehicle network in a distributed antenna vehicle using a plurality of antenna groups.

Various embodiments may minimize the cost of infrastructure installation for positioning by providing an absolute positioning method using a relative position for sidelink positioning between distributed antenna vehicles.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF DRAWINGS

The accompanying drawings are provided to provide an understanding of the present disclosure, and are intended to illustrate various embodiments of the present disclosure and, together with the description of the specification, explain the principles of the present disclosure.

BEST MODE

Figure 1:
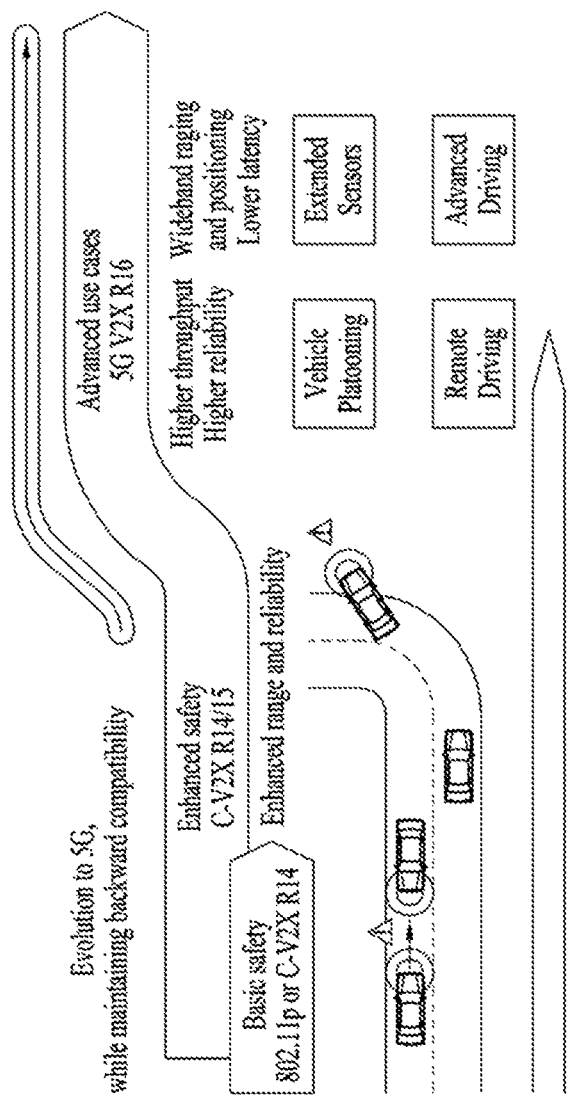
FIG. 1 is a diagram illustrating vehicle-to-everything (V2X) communication based on pre-new radio access technology (NR) RAT and V2X communication based on NR in comparison.

A sidelink positioning method in a positioning vehicle equipped with distributed antennas according to an aspect may include selecting a neighbor vehicle which is to participate in positioning by performing a preliminary operation for sidelink positioning, exchanging sidelink control information for positioning with the selected neighbor vehicle, reselecting an antenna group which is to participate in positioning based on a signal received from the selected neighbor vehicle; and performing positioning using the reselected antenna group.

MODE FOR CARRYING OUT DISCLOSURE

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 2:
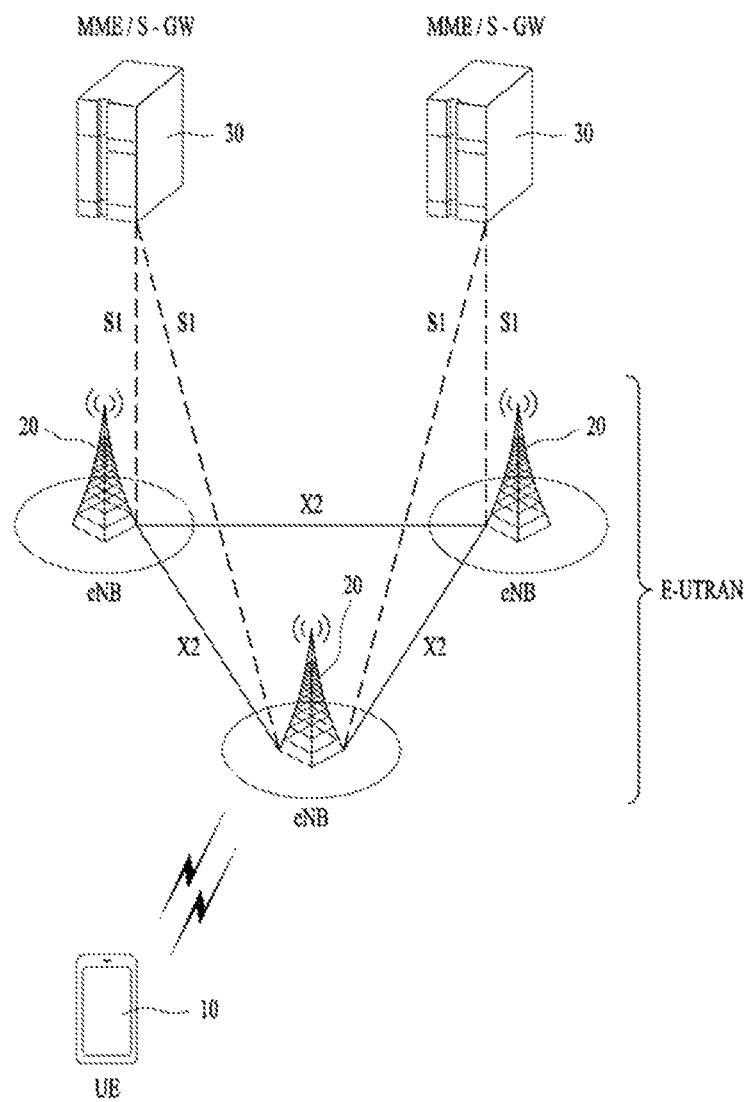
FIG. 2 is a diagram illustrating the structure of a long term evolution (LTE) system.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
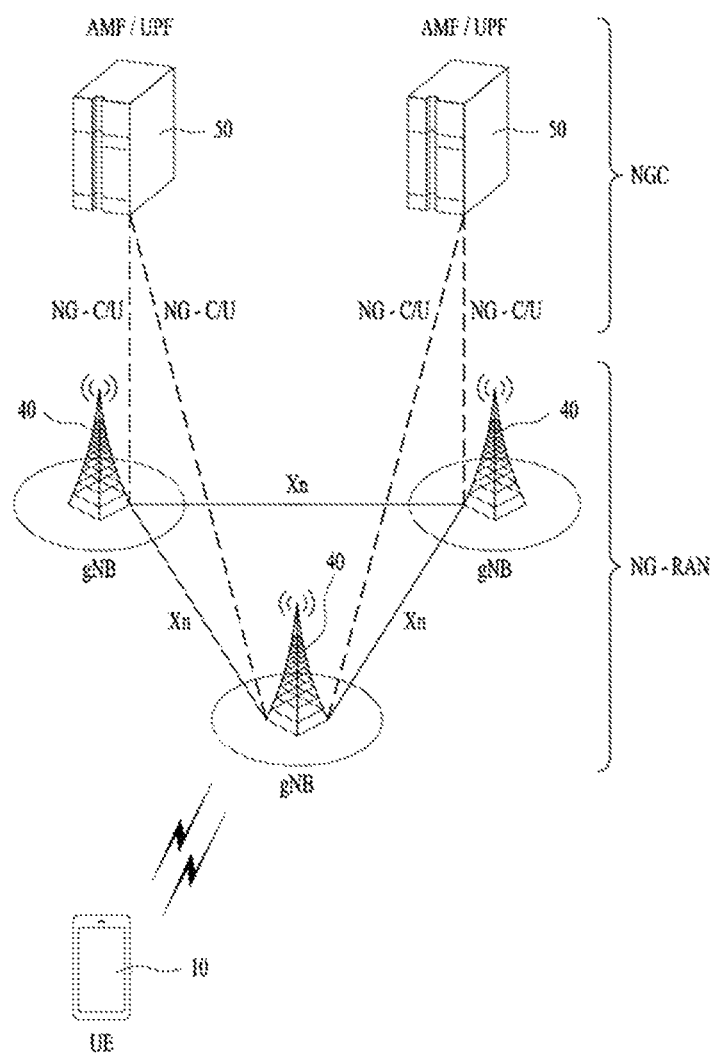
FIG. 3 is a diagram illustrating the structure of an NR system.

FIG. 3 illustrates the structure of an NR system

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
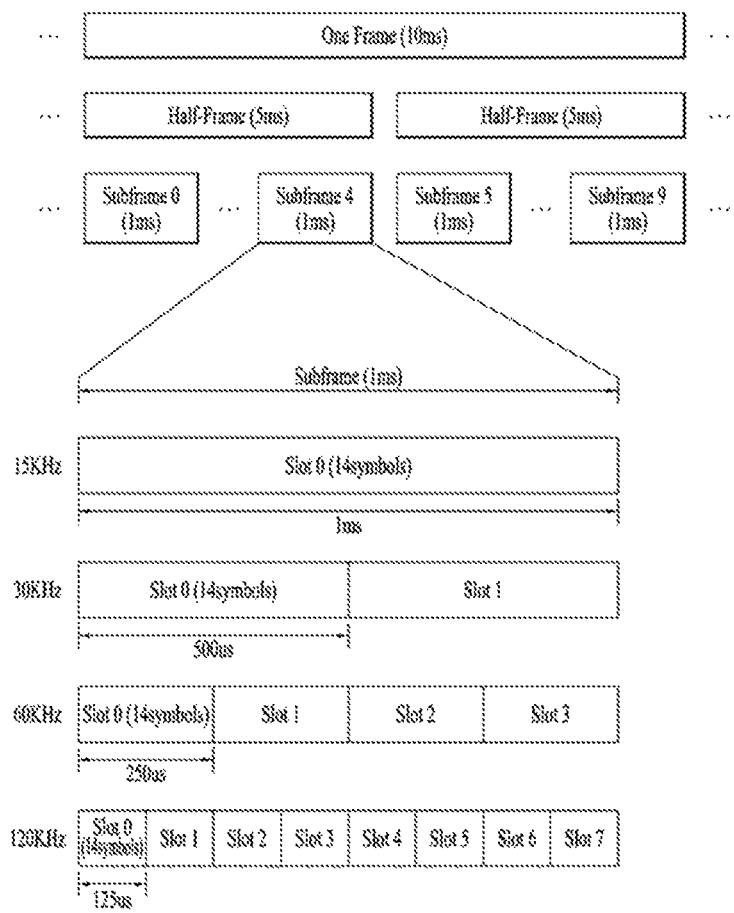
FIG. 4 is a diagram illustrating the structure of an NR radio frame.

FIG. 4 illustrates a radio frame structure in NR.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells. In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250MHz-52600MHz | 60, 120, 240 kHz |

Figure 5:
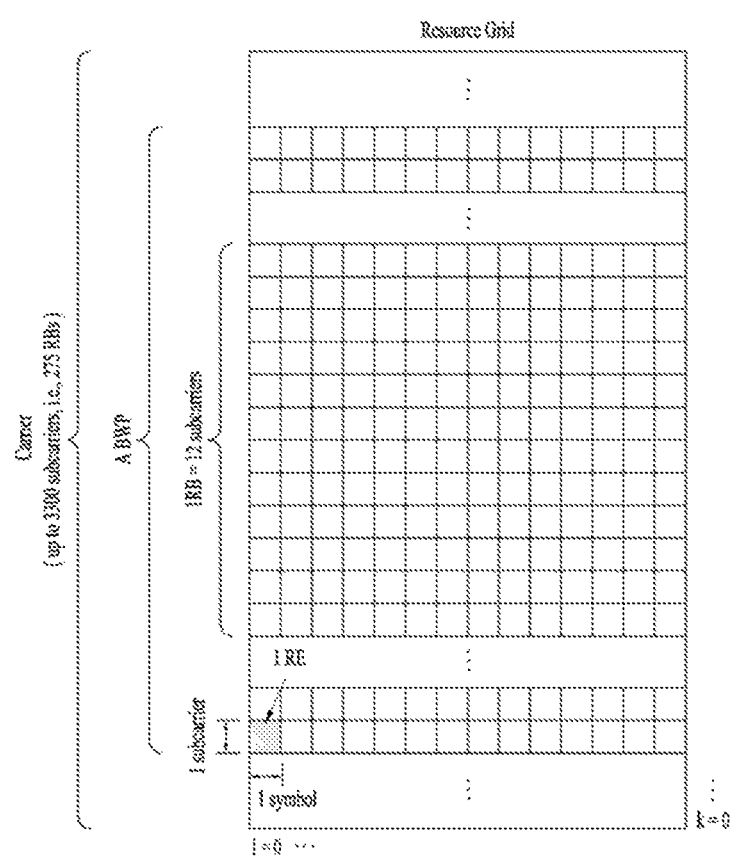
FIG. 5 is a diagram illustrating a slot structure in an NR frame.

FIG. 5 illustrates a slot structure in an NR frame.

Referring to FIG. 5, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 6:
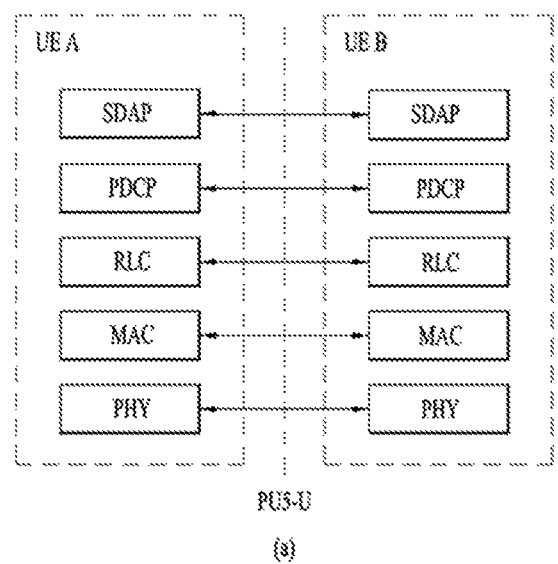
FIG. 6 is a diagram illustrating radio protocol architectures for sidelink (SL) communication.
Figure 6:
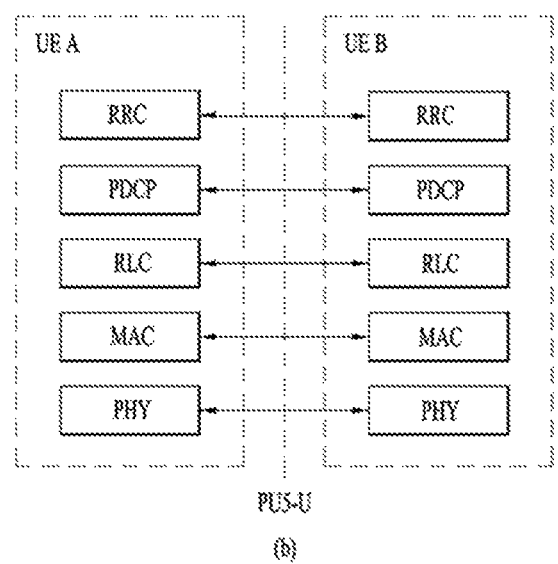

FIG. 6 illustrates a radio protocol architecture for SL communication Specifically, FIG. 6(a) illustrates a user-plane protocol stack in LTE, and FIG. 6(b) illustrates a control-plane protocol stack in LTE.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 7:
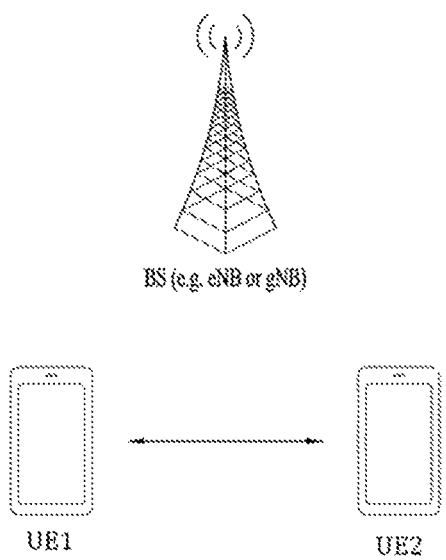
FIG. 7 is a diagram illustrating user equipments (UEs) which conduct V2X or SL communication between them.

FIG. 7 illustrates UEs that conduct V2X or SL communication between them.

Referring to FIG. 7, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 8:
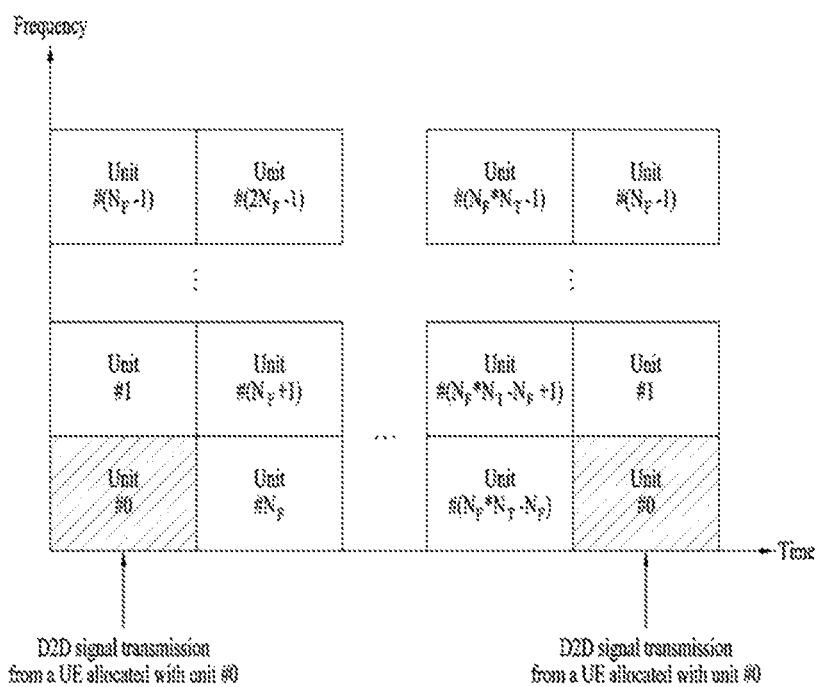
FIG. 8 is diagram illustrating resource units for V2X or SL communication.

FIG. 8 illustrates resource units for V2X or SL communication.

Figure 13:
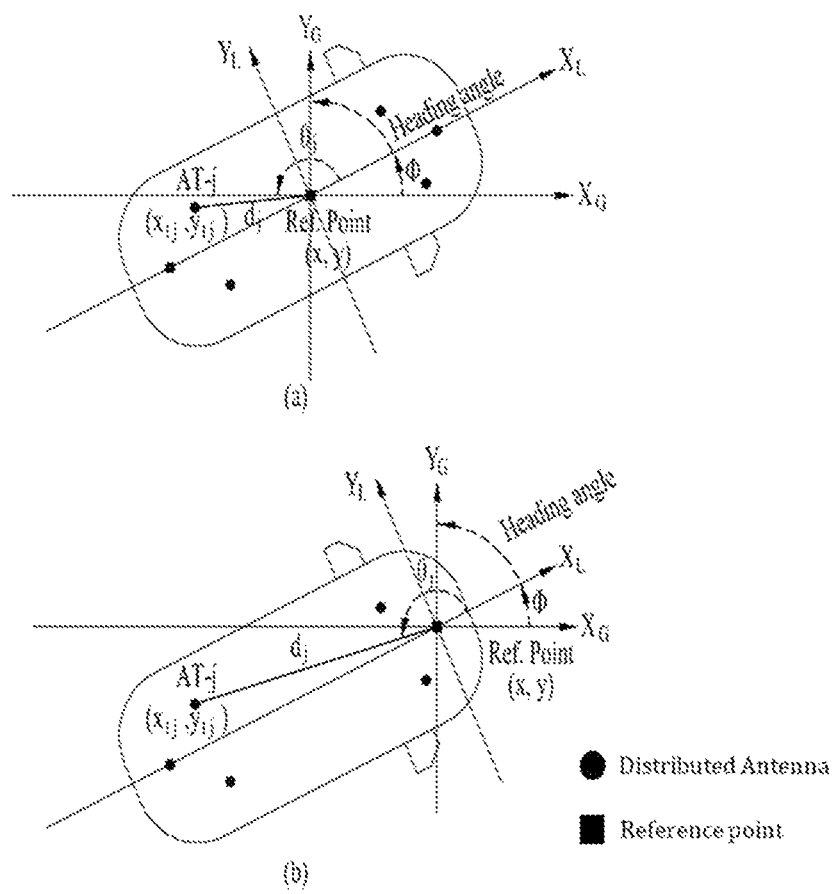
FIG. 13 is a diagram illustrating a location configuration method of a distributed antenna based on a reference point according to an embodiment.

Referring to FIG. 8, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrated in FIG. 8, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 9:
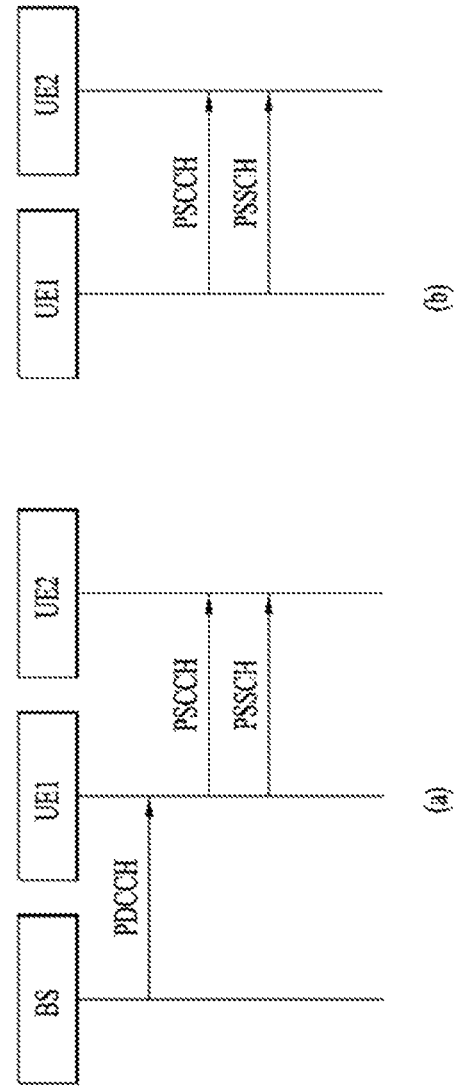
FIG. 9 is a diagram illustrating signal flows for V2X or SL communication procedures of a UE according to transmission modes.

FIG. 9 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 9 (a) illustrates a UE operation related to LTE transmission mode 1 or LTE transmission mode 3. Alternatively, for example, FIG. 9 (a) illustrates a UE operation related to NR resource allocation mode 1. For example, LTE transmission mode 1 may be applied to general SL communication, and LTE transmission mode 3 may be applied to V2X communication.

For example, FIG. 9 (b) illustrates a UE operation related to LTE transmission mode 2 or LTE transmission mode 4. Alternatively, for example, FIG. 9 (b) illustrates a UE operation related to NR resource allocation mode 2.

Referring to FIG. 9 (a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 9 (b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

PSSCH-related and/or PSCCH-related resource allocation information, for example, the positions/number of time/frequency resources, resource reservation information (e.g. a periodicity), and/or an SL channel state information (CSI) report request indicator or SL (L1) RSRP (and/or SL (L1) reference signal received quality (RSRQ) and/or SL (L1) received signal strength indicator (RSSI)) report request indicator, and/or an SL CSI transmission indicator (on PSSCH) (or SL (L1) RSRP (and/or SL (L1) RSRQ and/or SL (L1) RSSI) information transmission indicator), and/or MCS information, and/or transmission power information, and/or L1 destination ID information and/or L1 source ID information, and/or SL HARQ process ID information, and/or new data indicator (NDI) information, and/or redundancy version (RV) information, and/or QoS information (related to transmission traffic/packet), for example, priority information, and/or An SL CSI-RS transmission indicator or information about the number of SL CSI-RS antenna ports (to be transmitted);

Location information about a transmitting UE or location (or distance area) information about a target receiving UE (requested to transmit an SL HARQ feedback), and/or RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Hereinafter, acquisition of synchronization of a SL UE will be described.

In time division multiple access (TDMA) and frequency division multiples access (FDMA) systems, accurate time and frequency synchronization may be required. When the time and frequency synchronization are not accurate, system performance may be degraded due to inter symbol interference (ISI) and inter carrier interference (ICI). This is also applied to V2X in the same way. In V2X, for time/frequency synchronization, a sidelink (SL) synchronization signal (SLSS) may be used in a physical layer, and a master information block-sidelink-V2X (MIB-SL-V2X) may be used in a radio link control (RLC) layer.

Tx/Rx Beam Sweep

When a very high frequency is used as in mmWave, beamforming may be generally used to overcome high pathloss. In order to use beamforming, first, the best beam pair needs to be detected among several beam pairs between a transmitting end and a receiving end. This process may be referred to as beam acquisition or beam tracking or beam tracking in terms of the receiving end. In particular, in mmWave, analog beamforming is used, and thus a vehicle needs to perform beam sweeping for switching beams in different directions at different times using an antenna array of the vehicle itself during the beam acquisition or the beam tracking.

Multiple Active Sidelink BWPs

In NR V2X, communication through support of a plurality of BWPs (i.e., support of a plurality of configured sidelink BWPs and/or support of a plurality of active sidelink BWPs) may be considered. This may be for supporting different numerologies or heterogeneous services/communications that require parameters and/or requirements or may also be for ICI reduction due to a reduced CP length.

Figure 10:
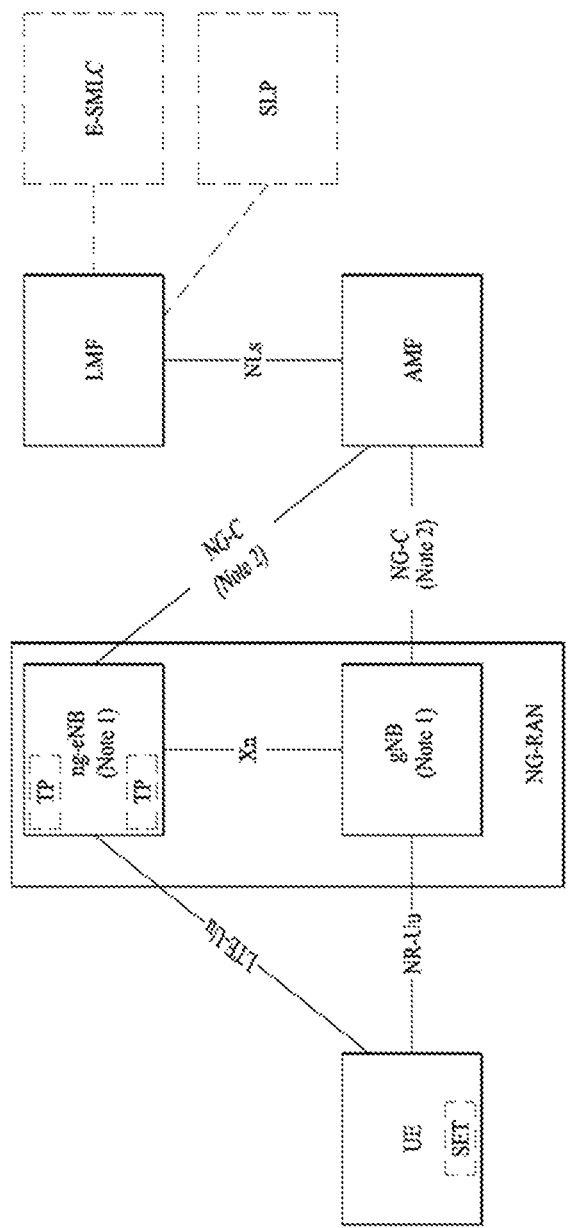
FIG. 10 illustrates an exemplary architecture of a 5G system capable of positioning a UE connected to an NG-RAN or an E-UTRAN according to an embodiment of the present disclosure.

FIG. 10 illustrates an exemplary architecture of a 5G system capable of positioning a UE connected to an NG-RAN or an E-UTRAN according to an embodiment of the present disclosure.

Referring to FIG. 10, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDoA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 11:
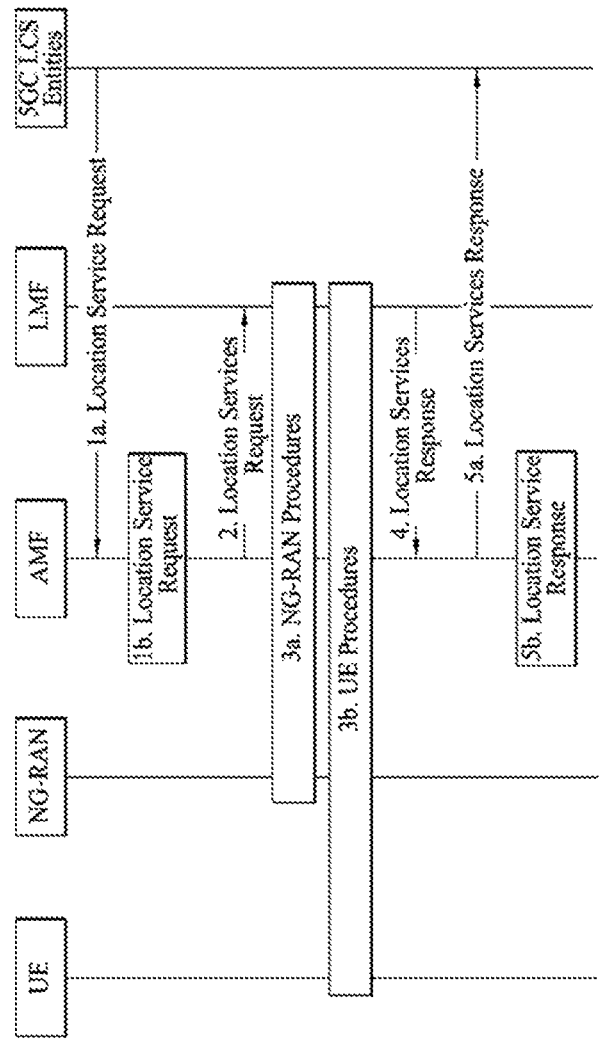
FIG. 11 illustrates exemplary implementation of a network for positioning a UE according to an embodiment of the present disclosure.

FIG. 11 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 11. That is, FIG. 11 may be based on the assumption that the UE is in connected mode. However, the signaling connection may be released by the NG-RAN due to signaling and data deactivation during positioning.

Referring to FIG. 11, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 11 is initiated in step 1a, the AMF may deliver the location service response to the 5GC entity such as the GMLC. When the procedure of FIG. 11 is initiated in step 1b, the AMF may use the location service response to provide the location service related to an emergency call or the like.

EMBODIMENT

A UE according to an embodiment to be described later may communicate with neighbor UEs through SL and communicate with a network through a Uu interface.

Here, the network may include a location server, a location measurement function (LMF), a BS, and the like, for positioning the UE. As an example, the UE may be provided in a vehicle, and a plurality of antennas, connected to the UE and distributed in the vehicle,—hereinafter, referred to as distributed antennas for convenience of description—may be mounted in the vehicle. A specific point in the vehicle may be predefined as a reference point and configured for the UE in the vehicle. As an example, the reference point may be defined and configured as a middle point of the vehicle or a center point of a front bumper of the vehicle. However, this is only one embodiment, and the location of the reference point may be differently defined and configured according to design of those skilled in the art. Although the reference point is configured as a fixed value, the actual location of the reference point may be changed according to the movement of the UE (i.e., vehicle). Hereinafter, the location of the reference point means the current location of the UE (or vehicle).

For example, although the number of reference points in the vehicle may be one, this is purely one embodiment, and a plurality of reference points may be arbitrarily defined and configured according to design of a person skilled in the art or the type of vehicle.

Figure 12:
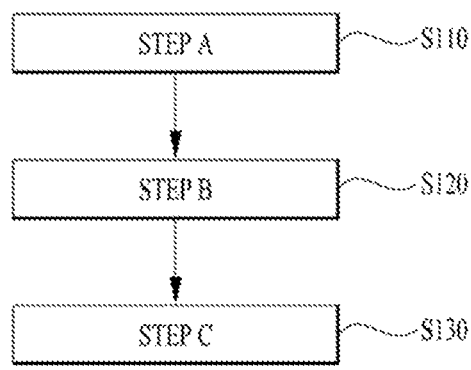
FIG. 12 is a flowchart illustrating a procedure for performing positioning using distributed antennas in a positioning vehicle equipped with the distributed antennas according to an embodiment.

FIG. 12 is a flowchart illustrating a procedure for performing positioning using distributed antennas in a positioning vehicle equipped with the distributed antennas according to an embodiment.

Referring to FIG. 12, the positioning vehicle may select a neighbor vehicle to participate in positioning and an antenna group to participate in positioning (S110, STEP A).

The positioning vehicle may perform a PRS transmission/reception procedure using the selected antenna group (S120, STEP B). Here, the PRS transmission/reception procedure may include transmitting a request PRS using a request PRS ID and receiving a response PRS corresponding to the request PRS.

The positioning vehicle may reselect an antenna group that will participate in positioning based on received quality, which is measured with respect to the response PRS, and measurement report information, which is received from a neighbor vehicle (S130, STEP C).

Detailed operations of STEP A to STEP C will become clear by a description of the drawings to be described later.

Location Configuration Method of Distributed Antenna

FIG. 13 is a diagram illustrating a location configuration method of a distributed antenna based on a reference point according to an embodiment.

For positioning of a vehicle equipped with distributed antennas, a reference point of the vehicle should be predefined.

The reference point is a point indicating the location of a vehicle and may be predefined as an arbitrary point of the vehicle, such as the center of the vehicle or the middle point of a front bumper of the vehicle. The reference point may be differently configured or defined according to vehicles.

In addition, the reference point may indicate the location of one antenna among distributed antenna groups or indicate a virtual location in the vehicle rather than the location of a distributed antenna group.

FIG. 13 illustrates an embodiment of configuring a reference point for measuring the location of a vehicle when a plurality of antennas (AT-j, j=1, . . . , N) is distributively disposed in the vehicle. Reference numeral (a) illustrates the case in which the reference point is disposed in the center (e.g., a roof) of the vehicle, and reference numeral (b) illustrates the case in which the reference point is disposed in the middle of a front bumper of the vehicle.

The reference point may also be used to indicate a relative position to the reference point of each of a plurality of distributed antenna groups provided in the vehicle.

Referring to FIG. 13, $\{X_G, Y_G\}$ denotes global coordinates $\{x,y\}$, and $\{x_L, Y_L\}$ denotes local coordinates $\{x,y\}$. The local coordinates of a positioning vehicle may or may not be equal to the local coordinates of a neighbor vehicle. In this case, the longer of a horizontal length and a vertical length of a vehicle may be configured as the x-axis of the local coordinates or other criteria may be used to configure the x-axis of the local coordinates.

A heading angle is an angle between the x-axis of the local coordinates and the y-axis of the global coordinates and may be measured counterclockwise.

In FIG. 13, a distributed antenna may mean an antenna group including one or more antenna elements.

Hereinafter, a location measurement method of the reference point using the location of each distributed antenna will be described in detail with reference to FIG. 13. In this case, the location measurement methods for the cases (a) and (b) of FIG. 13 may be the same or similar.

The location of the reference point using the location $(x_{tj}, y_{tj})$ of each distributed antenna group may be represented as Equation (1) below.

$$(x,y) = (x_{tj}, y_{tj}) + (\Delta x_j, \Delta y_j), j = 1, \ldots, N \quad (1)$$

In Equation (1), (x,y) represents the location of the reference point, and $(\Delta x_j, \Delta y_j)$ represents a relative position of the j-th antenna group to the reference point. $(\Delta x_j, \Delta y_j)$ may be represented as $(\Delta x_j, \Delta y_j) = (d_j \cos(\emptyset + \theta_j), d_j \sin(\emptyset + \theta_j))$ using an angle $\theta_j$ of the j-th distributed antenna group located counterclockwise based on the x-axis $X_L$ of the local coordinates, an angle $\emptyset$ between the x-axis $X_G$ of the global coordinates and heading of the vehicle, and a distance $d_j$ between the reference point and the j-th distributed antenna. Herein, $\{\emptyset, \theta_j, d_j\}$ may be predefined or may be measured by the vehicle. A heading angle may be represented as $\pi/2 - \emptyset$ based on the global coordinates. As a result, the location of the reference point using the location of the j-th distributed antenna of Equation (1) may be represented as Equation (2) below.

$$(x,y) = (x_{tj}, y_{tj}) + (d_j \cos(\emptyset + \theta_j), d_j \sin(\emptyset + \theta_j)) \quad (2)$$

Next, the location of an antenna group of a single-antenna vehicle and a reference point will be described. The location of the antenna group in the single-antenna vehicle may be configured as a predefined arbitrary point of the vehicle, such as the center of the vehicle or the middle point of a front bumper of the vehicle. Although the reference point may be configured as a point at which the antenna group is located, this is purely one embodiment. As another embodiment, similar to the distributed antenna vehicle described above, the reference point may be configured as a virtual position in the vehicle, for example, the center point of the vehicle or the middle point of the front bumper of the vehicle, rather than the location of the antenna group.

Hereinafter, a procedure for performing SL positioning between a positioning vehicle and a neighbor vehicle, proposed in consideration of various scenarios in a distributed antenna vehicle network, will be described in detail.

SL Positioning Procedure in Distributed Antenna Vehicle System

Figure 14:
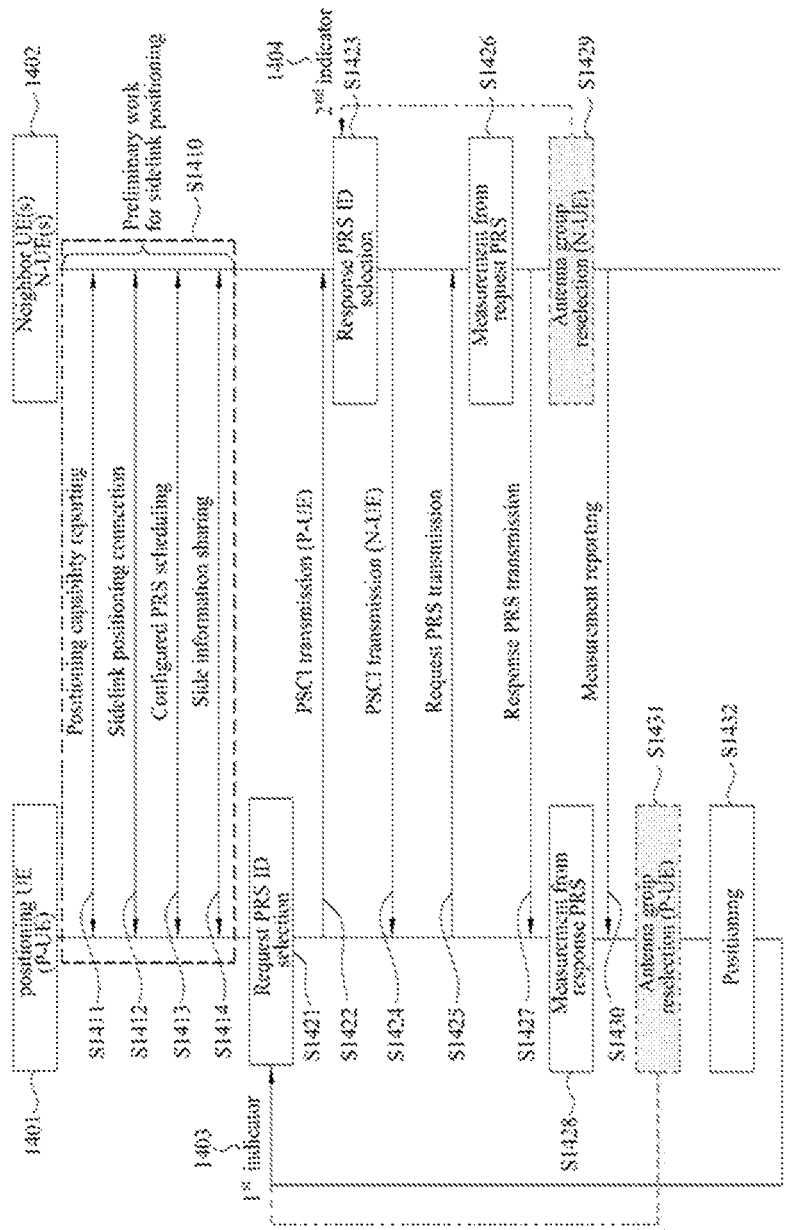
FIG. 14 is a flowchart illustrating a procedure for performing positioning between a positioning vehicle and a neighbor vehicle in a distributed antenna vehicle network according to an embodiment.

FIG. 14 is a flowchart illustrating a procedure for performing positioning between a positioning vehicle and a neighbor vehicle in a distributed antenna vehicle network according to an embodiment.

A UE according to an embodiment may include a vehicle or a robot.

Hereinbelow, a vehicle will be described as an example of a UE.

Referring to 14, a positioning UE (P-UE) 1401 and neighbor UE(s) (N-UE(s)) 1402 may perform preliminary work for SL positioning therebetween (S1410).

Here, the preliminary work for SL positioning may include positioning capability reporting (S1411), SL positioning connection (S1412), configured PRS scheduling (S1413), and side information sharing (S1414).

Hereinafter, the preliminary work for SL positioning will be described in detail.

(1) Positioning Capability Reporting (S1411)

The positioning vehicle 1401 may report positioning capability information, positioning status information, and location information to a network or to the network, a BS, or the neighbor vehicle 1402 through a Uu link between the BS and a vehicle or through SL between vehicles. In this case, the report on the positioning capability information may be conducted in a periodic, non-periodic, or on-demand form.

The positioning capability information of a vehicle may mainly include information about the number of antenna groups mounted on the vehicle, information about the maximum number of antenna groups available for positioning, information about a location at which each antenna group is installed in the vehicle, information about the number of antenna elements constituting each antenna group, and information about resolution of an angle of arrival (AoA) that may be measured by each antenna group.

The positioning status information of a vehicle may include a positioning request indication (PRI) indicating whether the vehicle requests positioning. In an embodiment, the vehicle may indicate that the vehicle requests positioning through RRI="1" and does not request positioning through PRI="0". The positioning status information of the vehicle may also include a positioning attending indication (PAI) indicating whether the vehicle participates in positioning. In an embodiment, the vehicle may indicate that the vehicle participates in positioning through PAI="1" and does not participate in positioning through PAI="0". The positioning status information of the vehicle may also include a positioning type indication (PTI) indicating the type of positioning that the vehicle demands or the vehicle may participate in positioning. In an embodiment, PTI="0" may mean absolute positioning, and PTI="1" may mean relative positioning.

The location information of a vehicle may include absolute location information stored by the vehicle at a time when the positioning capability information is reported and a positioning quality indication (PQI) (or confidence-level information). In this case, the absolute location information may be used for the purpose of performing absolute positioning between vehicles and selecting an antenna group participating in positioning using the absolute location information between vehicles.

As an embodiment, when the positioning vehicle 1401 and the neighbor vehicle 1402 each having one antenna group mounted on a front bumper and one antenna group mounted on a rear bumper of the vehicle are traveling in a line on a one-lane road (in this case, it is assumed that the neighbor vehicle travels in front of the positioning vehicle), the positioning vehicle 1401 selects, as an antenna group for positioning participation, the antenna group located on the front bumper thereof using the absolute location information of the ego vehicle and the neighbor vehicle 1402, and the neighbor vehicle 1402 may select the antenna group located on the rear bumper thereof as the antenna group for positioning participation through a similar operation.

2) Side Link Positioning Connection (S1412)

The positioning vehicle 1401 and the neighbor vehicle 1402 to participate in SL positioning between vehicles are determined based on the information obtained in positioning capability reporting S1401, and the number and locations of antenna groups to participate in positioning in the positioning vehicle 1401 and the number and locations of antenna groups to participate in positioning in the neighbor vehicle 1402 are determined. This process may be performed by the network, the BS, or the vehicles. In this case, since each vehicle may participate in one or more SL positioning operations, the vehicle may not use all of antenna groups mounted thereon for one SL positioning operation. For example, one vehicle may participate in multiple SL positioning operations as the neighbor vehicle 1402. In addition, one vehicle may simultaneously serve as the positioning vehicle 1401 and the neighbor vehicle 1402. Next, a negotiation method between vehicles and a non-negotiation method between vehicles will be described in order for a vehicle to determine the positioning vehicle 1401 and the neighbor vehicle 1402 which will participate in SL positioning.

a) Negotiation method between vehicles: In a negotiation process between vehicles, the positioning vehicle 1401 may preferentially select suitable candidates of the neighbor vehicle to participate in positioning thereof using positioning-related information obtained from other vehicles which are present in the same vehicle network. The positioning vehicle 1401 may select the maximum/minimum number of antenna groups to participate in positioning expected from the neighbor vehicle 1402. In this case, the number of selected candidates of the neighbor vehicle 1402 may be one or more according to the type of positioning and positioning capability of the neighbor vehicle 1402. Next, the positioning vehicle 1401 may request participation in positioning thereof by transmitting a unique ID thereof or an ID assigned for a unicast operation to the selected candidates of the neighbor vehicle 1402. In this case, the positioning vehicle 1401 may finally perform positioning with a candidate of the neighbor vehicle 1402 that has responded to the request.

b) Non-negotiation method between vehicles: In a non-negotiation process between vehicles, a negotiation process between the positioning vehicle 1401 and the candidate of the neighbor vehicle 1402 is not required. As an example, the positioning vehicle 1401 may inform an unspecified vehicle of information about a type of positioning to be performed and PRS scheduling information in order to perform quick positioning. Here, the PRS scheduling information may include PRS information transmitted by the positioning vehicle 1401 and PRS information transmitted in response by the neighbor vehicle 1402, and a detailed method thereof will be described later. In addition, the positioning vehicle 1401 may inform the neighbor vehicle 1402 of information about the number of antenna groups thereof to be used for positioning and information about the maximum/minimum number of antenna groups expected from the neighbor vehicle 1402. When the positioning vehicle 1401 does not provide the above-described information to the neighbor vehicle 1402, the number of predefined default antenna groups and the locations of the default antenna groups may be applied to positioning. Next, if a vehicle that has received the above-mentioned information from the positioning vehicle 1401 determines that itself is the neighbor vehicle 1402 suitable for participating in positioning, the vehicle may transmit information necessary for positioning and a PRS to the positioning vehicle 1401. The neighbor vehicle 1402 may provide information about the number of antenna groups that are capable of participating (or are participating) in positioning and location information of each of antenna groups that are capable of participating (or are participating) in positioning to the positioning vehicle 1401. Finally, the positioning vehicle 1401 may perform positioning using the information received from the neighbor vehicle 1402.

3) Configured PRS Scheduling (S1413)

PRS scheduling information configured to perform SL positioning may be provided to the positioning vehicle 1401 and the neighbor vehicle 1402. As an example, PRS scheduling may be statically (or dynamically) configured by the location server/LMF and/or the BS and then be provided to the positioning vehicle 1401 and the neighbor vehicle 1402. As another embodiment, PRS scheduling may be configured by previously mapping or defining the relationship between a request PRS transmitted by the positioning vehicle 1401 and a response PRS transmitted by the neighbor vehicle 1402 in response to the request PRS. The configured PRS scheduling information may include a variety of information related to a PRS operation, such as information about a PRS slot configuration for request/response PRS transmission, information about frequency/time resources allocated for request/response PRS transmission, information about a unique ID assigned for distinguishing between the request PRS and the response PRS, information about a maximum available time during which request/response PRS transmission is allowed, information about the maximum/minimum number of antenna groups that are available for positioning (or are capable of participating in positioning) by the positioning vehicle 1401 and the neighbor vehicle 1402 (or may participate in positioning), and information about the location of each antenna group.

4) Side Information Sharing (S1414)

The neighbor vehicle 1402 participating in positioning may previously provide information about the relative position of each antenna group to a reference point and information about the location of each antenna group provided in the neighbor vehicle 1402 to the positioning vehicle 1401 together with the configured PRS scheduling information and may share the provided information with the positioning vehicle 1401.

For example, the neighbor vehicle 1402 may provide the positioning vehicle 1401 with information about the relative position of each antenna group provided with respect to a reference point thereof. The heading angle information of the vehicle described with reference to FIG. 13 may be provided to the positioning vehicle 1401 in side information sharing S1414 or may be provided to the positioning vehicle 1401 in measurement reporting S1430 of FIG. 14 to be described later.

As another example, the neighbor vehicle 1402 may provide information about the relative position of a reference point with respect to each antenna group thereof to the positioning vehicle 1401. In this case, the heading angle information of the vehicle described with reference to FIG.

13 may be provided to the positioning vehicle 1401 in side information sharing S1414 or in measurement reporting S1430 of FIG. 14 to be described later.

The positioning vehicle 1401 may select and reserve a request PRS ID in order to transmit a request PRS to the neighbor vehicle 1402 (S1421). In this case, the request PRS ID may be determined by the location server/LMF and/or the BS or may be determined through sensing-based reservation of the positioning vehicle 1401.

When the number of antenna groups used for positioning is one or more, the positioning vehicle 1401 may select and reserve different request PRS IDs for respective antenna groups in order to distinguish between the antenna groups. Alternatively, the positioning vehicle 1401 may use the same request PRS ID for all antenna groups but reserve time-division transmission so that the request PRSs transmitted through respective antenna groups may not overlap each other.

Referring to FIG. 14, when the number of antenna groups participating in positioning and the location of each antenna group are reselected/configured in antenna group reselection (by the P-UE) (S1431), the positioning vehicle 1401 may re-perform the process of determining and reserving a request PRS ID for transmitting the request PRS through each antenna group. In FIG. 14, a first indicator 1403 is an indicator indicating whether reselection of the request PRS ID is required.

The positioning vehicle 1401 may determine an available time for response PRS transmission in addition to selection of the request PRS ID. For example, upon receiving the request PRS from the positioning vehicle 1401, the neighbor vehicle 1402 should transmit a response PRS in response to the request PRS received within the available time.

The positioning vehicle 1401 may transmit positioning-related sidelink control information (SCI) (PSCI), which is positioning-related signaling information, to the neighbor vehicle 1402 before transmitting the request PRS (S1422).

Here, the PSCI transmitted by the positioning vehicle 1401 may include the following information:
- information related to resource reservation for request PRS transmission, including request PRS ID information,
- information for requesting the number of antenna groups of the neighbor vehicle 1402 that participates in positioning or expects to participate in positioning and the location of each antenna group, wherein the corresponding information may be requested based on the positioning capability information received from the neighbor vehicle 1402 through preliminary work for SL positioning (S1410), and a related description will be given in detail in antenna group reselection (S1431) by the positioning vehicle,
- indicator information indicating whether an antenna group participating in positioning has been reselected by the positioning vehicle 1401,
- information about the number of antenna groups participating in positioning according to antenna group reselection when the antenna group participating in positioning has been reselected, information about the location of each antenna group, and information about a request PRS ID transmitted through each antenna group, wherein, as an example, when an antenna group of the positioning vehicle 1401 is reselected, a request PRS ID that has been used in the changed antenna group may be reused or a new request PRS ID may be allocated and used, and
- indicator information indicating whether it is necessary to reselect/reconfigure an antenna group of the neighbor vehicle 1402 from the viewpoint of the positioning vehicle 1401. For example, referring to FIG. 14, when RSRP measured in measurement S1428 from a response PRS is less than a specific threshold, the positioning vehicle 1401 may request the neighbor vehicle 1402 to perform an antenna group reselection procedure. For example, when a new request PRS ID is allocated, the positioning vehicle 1401 and/or the network may provide information indicating whether a request PRS ID is changed (request PRS ID change indication; RPCI-1) to the neighbor vehicle 1402. As an example, the positioning vehicle 1401 may announce that the request PRS ID has been changed through RPCI-1="1" and announce that the request PRS ID has not been changed through RPCI-1="0".

The positioning vehicle 1401 may transmit a predetermined signal including PSCI indicating that the request PRS ID has been changed, for example, a PSCI transmission (by the P-UE) signal, to the neighbor vehicle 1402 (S1422).

The neighbor vehicle 1402 may select a response PRS ID for transmission of a response PRS according to reception of the PSCI transmission (by the P-UE) signal (S1423). For example, the response PRS ID may be determined and reserved through a sensing process. As another example, the response PRS ID may be reserved through a process of previously mapping/defining the response PRS ID in response to the request PRS ID. When the positioning vehicle 1401 participates in one or more SL positioning operations, the positioning vehicle 1401 may have one or more different response PRS IDs. When the number of antenna groups used for positioning is one or more, different response PRS IDs for respective antenna groups may be selected to distinguish between the antenna groups.

In an embodiment, the number of antenna groups participating in positioning in antenna group reselection (by the N-UE) (S1429) of the neighbor vehicle 1402 and the location of each antenna group are reselected/configured by the neighbor vehicle 1402, the neighbor vehicle 1402 may re-perform the process of determining and reserving the response PRS ID for transmitting the response PRS through each antenna group. In FIG. 14, a second indicator 1404 is an indicator indicating whether a process of reselecting the response PRS ID is necessary. In this case, the neighbor vehicle 1402 may reuse a response PRS ID which has been used in the reselected antenna group or a new response PRS ID may be allocated thereto. In another embodiment, when an antenna group for the neighbor vehicle 1402 is reselected by the positioning vehicle 1401 and/or the network and a new response PRS ID is allocated, the positioning vehicle 1401 and/or the network may provide information indicating whether the response PRS ID has been changed (response PRS ID change indication; RPCI-2) to the corresponding neighbor vehicle 1402. In this case, as an example, the positioning vehicle 1401 and/or the network may announce that the response PRS ID has been changed through RPCI-2="1" and that the response PRS ID has not been changed through RPCI-2="0".

In an embodiment, upon receiving a necessity and a request for reselection/configuration an antenna group for transmitting the response PRS from the positioning vehicle 1401, the neighbor vehicle 1402 may perform a process of redetermining and reserving the response PRS ID.

Before transmitting the response PRS, the neighbor vehicle 1402 may transmit a predetermined signal including the PSCI, indicating that the response PRS ID has been changed, for example, the PSCI transmission (by the N-UE) signal, to the positioning vehicle 1401 (S1424). Here, the PSCI may include the following main information:
- information related to resource reservation for response PRS transmission, including response PRS ID information,
- an indicator indicating whether an antenna group participating in positioning has been reselected from the viewpoint of the neighbor vehicle 1402, and
- information about the number of antenna groups participating in positioning when the antenna group participating in positioning has been reselected, information about the location of each antenna group, and information about a response PRS ID transmitted through each antenna group.

The positioning vehicle 1401 may transmit a request PRS to the neighbor vehicle 1402 using the selected and reserved request PRS ID (S1425). In this case, the positioning vehicle 1401 may record information about a time at which the request PRS is transmitted. If the number of antenna groups used for positioning is one or more, the positioning vehicle 1401 may record information about a time at which the request PRS is transmitted through each antenna group.

Upon receiving the request PRS, the neighbor vehicle 1402 may record information about a time at which the request PRS is received from the positioning vehicle 1401 and measure information related to positioning and link quality (or channel quality), such as AoA or RSRP (S1426).

In addition to link quality measurement using the request PRS, the neighbor vehicle 1402 according to an embodiment may determine link quality through an RSSI measured using data information received from the positioning vehicle 1401.

The information measured by the neighbor vehicle 1402 may be transmitted to the positioning vehicle 1401 or used in a positioning process such as antenna group reselection of an ego vehicle. Here, the ego vehicle refers to a vehicle thereof, that is, the corresponding neighbor vehicle 1402. In this case, the link quality information, such as RSRP or RSSI, transmitted to the positioning vehicle 1401 may be used by the positioning vehicle 1401 to select the antenna group of the neighbor vehicle 1402.

When the antenna group is reselected in the positioning process, the neighbor vehicle 1402 may record information about a time at which the request PRS is received through the changed antenna group and measure AoA, RSRP, RSSI, etc.

When the number of antenna groups participating in positioning is one or more, the neighbor vehicle 1402 may record information about a time at which the request PRS is received through each antenna group and measure AoA, RSRP, RSSI, etc. for each antenna group.

The neighbor vehicle 1402 may transmit a response PRS to the positioning vehicle 1401 using the selected response PRS ID (S1427). In this case, the neighbor vehicle 1402 may record information about a time when the response PRS is transmitted. If the number of antenna groups participating in positioning is one or more, the neighbor vehicle 1402 may record information about a time when the response PRS through each antenna group is transmitted.

The positioning vehicle 1401 may record information about a time when the response PRS is received from the neighbor vehicle 1402 and measure link quality related to positioning, such as AoA and RSRP, for the received response PRS (S1428).

When an antenna group is reselected in the positioning process, the positioning vehicle 1401 may record information about a time at which the response PRS is received through each changed antenna group and measure AoA, RSRP, RSSI, etc., based on the response PRS received through each antenna group.

If the number of antenna groups participating in positioning is one or more according to antenna group reselection, the positioning vehicle 1401 may record information about a time at which the response PRS is received through each antenna group and measure AoA, RSRP, RSSI, etc.

The neighbor vehicle 1402 may perform an antenna group reselection procedure after transmission of the response PRS (S1429).

The neighbor vehicle 1402 may also reselect an antenna group participating in positioning at the request of the positioning vehicle 1401 (S1429). In this case, the antenna group which is reselected in correspondence to the neighbor vehicle 1402 may also be determined by the positioning vehicle 1401 according to an operation method and then transmitted to the neighbor vehicle 1402. The procedure for the neighbor vehicle 1402 to reselect/configure the antenna group to participate in positioning may be similar to or the same as the procedure for the positioning vehicle 1401 to reselect/configure the antenna group to participate in positioning. A detailed description of the procedure for reselecting/configuring the antenna group to participate in positioning will be replaced with a description of the procedure for the positioning vehicle 1401 to reselect/configure the antenna group to participate in positioning, which will be described later.

The neighbor vehicle 1402 may transmit a measurement reporting signal to the positioning vehicle 1401 (S1430). Here, the measurement reporting signal may include time difference information calculated based on a time when the response PRS is transmitted and a time when the request PRS is received, and information about positioning and link quality such as AoA and RSSI for the request PRS. When the number of antenna groups participating in positioning is one or more, the neighbor vehicle 1402 may report information about positioning and link quality measured for each antenna group to the positioning vehicle 1401.

Hereinafter, a method of reporting information related to the location of a reference point of a vehicle and the location of an antenna group to the positioning vehicle 1401 in consideration of a positioning type in which the neighbor vehicle 1402 participates will be described in detail.

When the neighbor vehicle 1402 participates in absolute positioning, the PQI and the location of the reference point of a vehicle reported in positioning capability reporting S1411 may be updated to compensate for an error according to the movement of the vehicle. In this case, the absolute position of the reference point of the vehicle may be transmitted through first PSCI of a PSCCH (or data of a PSSCH or second PSCI of the PSSCH). Here, PSCI may be control information different from SCI for transmitting NR-V2X service related control transmission. The PSCI and SCI may be transmitted by being mapped to separate resources, respectively, and may be transmitted in two stages. For example, the first PSCI and the second PSCI may be mapped to different physical channels in one transmission slot, mapped to different physical channels in consecutive transmission slots of the same type, mapped to different physical channels in non-consecutive transmission slots of the same type, mapped to different physical channels in consecutive transmission slots of different types, or mapped to different physical channels in non-consecutive transmission slots of different types. In this case, a transmission slot and a physical channel mapped to transmit the first PSCI and the second PSCI may be dynamically determined based on at least one of the amount of control information for positioning, a positioning method, the number of antenna groups to be used for positioning, or a positioning type. As an embodiment, the resource allocation location of the second PSCI may be indicated by the first PSCI. A transmission slot to which the first PSCI and the second PSCI are mapped may be any one of an NR-V2X service slot and a PRS slot. The physical channels to which the first PSCI and the second PSCI are mapped may include a PSCCH and a PSSCH.

When the neighbor vehicle 1402 participates in relative positioning, the neighbor vehicle 1402 may report 1) information about the relative position of at least one antenna group participating in positioning with respect to the location of the reference point or 2) information about the relative position of the reference point for at least one antenna group participating in positioning to the positioning vehicle 1401. In this case, the relative position of the reference point of the vehicle or the relative position of the antenna group may be transmitted through the second PSCI of the PSSCH (or the data of the PSSCH or the first PSCI of the PSCCH).

In the above embodiment, information related to the location of the reference point of the vehicle and the location of the antenna group has been described as being transmitted through the PSCI. However, this is purely one embodiment and the information may be transmitted through existing SCI according to design of those skilled in the art.

When the neighbor vehicle 1402 participates in relative positioning, and the relative position of each antenna group and the relative position of the reference point, except for heading angle information of the vehicle, are provided in a side information sharing (S1414), the heading angle information of the vehicle may be provided to the positioning vehicle 1401 in measurement reporting S1430.

RSRP for the request PRS, measured for each antenna group participating in positioning, may perform the following functions.

As an example, information about measured RSRP for the request PRS may be used as indicator information indicating whether an antenna group of the positioning vehicle 1401 needs to be reselected/configured from the viewpoint of the neighbor vehicle 1402. That is, the positioning vehicle 1401 may determine whether antenna group reselection/configuration is necessary based on the RSRP information received from the neighbor vehicle 1402.

As another example, measured RSRP for the request PRS may also be used as a determination criterion for the neighbor vehicle 1402 to notify the positioning vehicle 1401 of the necessity for antenna group reselection/configuration or to request the positioning vehicle 1401 to perform antenna group reselection/configuration.

The positioning vehicle 1401 may perform an antenna group reselection procedure based on the received measurement reporting signal (S1431).

Hereinafter, the antenna group reselection procedure of the positioning vehicle 1401 will be described in detail.

The positioning vehicle 1401 may reselect an antenna group of the ego vehicle in consideration of link quality of the antenna group of the ego vehicle and link quality of an antenna group of the neighbor vehicle 1402 participating in positioning.

As an example, the positioning vehicle 1401 may reselect an antenna group with reference to link quality information, such as RSRP measured using the received response PRS, RSRP received in the measurement reporting signal, and/or RSSI measured using data received from the neighbor vehicle 1402. For example, the positioning vehicle 1401 may replace an antenna group having link quality lower than a specific threshold with another antenna group which has link quality higher than the corresponding threshold and is not currently participating in positioning. Thereafter, the reselected antenna group may receive a response PRS.

The positioning vehicle 1401 according to an embodiment may determine positioning topology between the antenna group of the ego vehicle and the antenna group of the neighbor vehicle 1402 participating in positioning and reselect the antenna group of the ego vehicle in consideration of the determined positioning topology.

As an example, the positioning vehicle 1401 may determine positioning topology using AoA measured using the response PRS received from the neighbor vehicle 1402 and/or AoA measured in correspondence to the request PRS provided by the measurement reporting signal and reselect antenna groups of the ego vehicle and/or the neighbor vehicle 1402 capable of improving positioning performance in consideration of the determined positioning topology.

The positioning vehicle 1401 may increase or decrease the number of antenna groups of the ego vehicle in consideration of the positioning topology between the antenna group of the ego vehicle and the antenna group of the neighbor vehicle 1402 participating in positioning. For example, when positioning topology formed by the antenna group of the positioning vehicle 1401 and the antenna group of the neighbor vehicle 1402 participating in positioning is not suitable for positioning or degrades positioning performance, the positioning vehicle 1401 and/or the neighbor vehicle 1402 may configure positioning topology suitable for positioning by reselecting the antenna group participating in positioning.

As an example, when the number of antenna groups of the positioning vehicle 1401 that participate in positioning and the number of antenna groups of the neighbor vehicle 1402 that participate in positioning are insufficient so that it is expected that positioning performance will be degraded in terms of positioning topology, and when there are antenna groups that do not participate in positioning in the positioning vehicle 1401, the positioning vehicle 1401 may reselect the antenna group participating in positioning so that the antenna group that does not participate in positioning may be included. Alternatively, when there are antenna groups that do not participate in positioning in the neighbor vehicle 1402, the positioning vehicle 1401 may request the neighbor vehicle 1402 to increase the number of antenna groups participating in positioning.

When the number of antenna groups of the positioning vehicle 1401 participating in positioning and the number of antenna groups of the neighbor vehicle 1402 participating in positioning are sufficient so that positioning performance will not be deteriorated in terms of positioning topology even if the number of antenna groups is reduced, the positioning vehicle 1401 may reselect the antenna group by reducing the number of antenna groups participating in positioning in the ego vehicle. Alternatively, when the number of antenna groups of the neighbor vehicle 1402 is sufficient so that positioning performance will not be deteriorated in terms of positioning topology even if the number of antenna groups participating in positioning is reduced, the positioning vehicle 1401 may request the neighbor vehicle 1402 to reduce the number of antenna groups participating in positioning.

The positioning vehicle 1401 may reselect the antenna group by reducing or increasing the number of antenna groups of the ego vehicle participating in positioning in consideration of a congestion level of channel resource use and positioning performance demanded by a higher layer.

As an example, the positioning vehicle 1401 may reduce the number of antenna groups of the ego vehicle participating in positioning in order to solve the problem of a high congestion level of channel resource use that may be generated as the number of vehicles participating in positioning increases. In this case, antenna groups excluded from positioning in the antenna group reselection process may be determined based on RSRP measured in each antenna group of the ego vehicle. That is, the positioning vehicle 1401 may preferentially exclude an antenna group having the lowest RSRP from antenna groups participating in positioning. Alternatively, the positioning vehicle 1401 may reduce the number of antenna groups of the neighbor vehicles 1402 participating in positioning in order to solve the problem of a high congestion level of channel resource use that may be generated as the number of vehicles participating in positioning increases. When it is necessary to reduce the number of antenna groups of the neighbor vehicle 1402 participating in positioning, the positioning vehicle 1402 may request the neighbor vehicle 1402 to decrease the number of antenna groups participating in positioning.

The positioning vehicle 1401 may increase the number of antenna groups of the ego vehicle when a usage rate of a channel resource for positioning is low and the higher layer requests positioning performance of high accuracy. In this case, antenna groups additionally participating in positioning in the antenna group reselection process may be determined based on RSRP measured in each antenna group of the ego vehicle. That is, the positioning vehicle 1401 may perform positioning by additionally selecting an antenna group in order of the highest RSRP. In addition, the positioning vehicle 1401 may increase the number of antenna groups of the neighbor vehicle 1402 when the usage rate of the channel resource for positioning is low and the higher layer requests positioning performance of higher accuracy. The positioning vehicle 1401 may request the neighbor vehicle 1402 that needs to increase the number of antenna groups to increase the number of antenna groups participating in positioning.

The positioning vehicle 1401 may determine whether it is necessary to control the number of antennas of the neighbor vehicle 1402 in consideration of link quality between the antenna group of the ego vehicle and the antenna group of the neighbor vehicle 1402 participating in positioning. The positioning vehicle 1401 may request reconfiguration of antenna groups by transmitting a predetermined control signal requesting an increase or decrease in the number of antennas to the neighbor vehicle 1402 according to a result of the determination.

The positioning vehicle 1401 may reselect the antenna group of the positioning vehicle 1401 in consideration of the link quality between the antenna group of the ego vehicle and the antenna group of the neighbor vehicle 1402 participating in positioning and then report a result of the antenna group reselection to the neighbor vehicle 1402.

The antenna group reselection process of the positioning vehicle 1401 may be performed by the positioning vehicle 1401, the network/BS/LMF, or the neighbor vehicle 1402. In particular, when antenna group reselection is performed by the network/BS/LMF, the positioning vehicle 1401 may provide measurement information such as RSRP and AoA required for antenna group reselection to the network/BS/LMF.

The positioning vehicle 1401 may reselect antenna groups participating in positioning at the request of the neighbor vehicle 1402. For example, when RSRP measured with respect to the request PRS received from the positioning vehicle 1401 is less than or equal to a threshold, the neighbor vehicle 1402 may request the positioning vehicle 1401 to reselect antenna groups. In this case, the neighbor vehicle 1402 may provide ID information of an antenna group in which the RSRP is less than or equal to the threshold and/or location information of the antenna group to the positioning vehicle 1401.

When the number of antenna groups participating in positioning is one or more, the positioning vehicle 401 may perform positioning for an absolute position of the ego vehicle using information about a time difference between a time when the response PRS measured in each antenna group is received and a time when the request PRS is transmitted, AoA measured for the response PRS, and various information reported by the neighbor vehicle 1402 (S1432). The change of antenna groups performed by the positioning vehicle 1401 and the change of antenna groups by the neighbor vehicle 1402, described above, may be performed after the positioning operation is completed once. For example, when it is assumed that the reserved number of positioning operations is 10, and when the current number of positioning operations is 3, positioning may be performed through the changed antenna group between the positioning vehicle 1401 and the neighbor vehicle 1402 in the next fourth positioning operation.

Hereinafter, an SL positioning operation in a network in which a vehicle equipped with distributed antennas and a vehicle equipped with a single antenna coexist will be described in detail.

Hereinafter, a main SL positioning method in a network in which a distributed antenna vehicle and a single-antenna vehicle coexist based on the proposed SL positioning procedure between the positioning vehicle and the neighbor vehicle in the distributed antenna vehicle network will be described. In this case, the vehicle network may be configured under the following assumptions.

In the following embodiments, a distributed antenna vehicle network composed of one positioning vehicle and one neighbor vehicle is considered, and the described SL positioning operation may be equally applied even to a network in which one positioning vehicle and a plurality of neighbor vehicles coexist.

In a single-antenna vehicle, one antenna group may be located in the middle of the roof of the vehicle, and the location of a reference point of the vehicle may be the same as or different from the location of the antenna group.

For example, when the location of the antenna group and the location of the reference point of the vehicle are different from each other, the location of the reference point of the vehicle may be measured using relative location information of the antenna group with respect to the reference point or relative location information of the reference point with respect to the location of the antenna group.

In the following embodiments, it is assumed that the distributed antenna vehicle has two antenna groups, and the described SL positioning operation may be applied in the same or similar manner even to the distributed antenna vehicle having a plurality of antenna groups.

From the above assumption, a total of four different SL positioning methods (SL positioning method-1 to SL positioning method-4) may be considered. Here, SL positioning includes absolute positioning and relative positioning, and each positioning operation is as follows.

A relative position of a neighbor vehicle with respect to a positioning vehicle may be measured through relative positioning to the neighbor vehicle. In contrast, an absolute position with respect to the positioning vehicle may be measured using a relative position of the neighbor vehicle with respect to the positioning vehicle and absolute location information of the neighbor vehicle.

Figure 15:
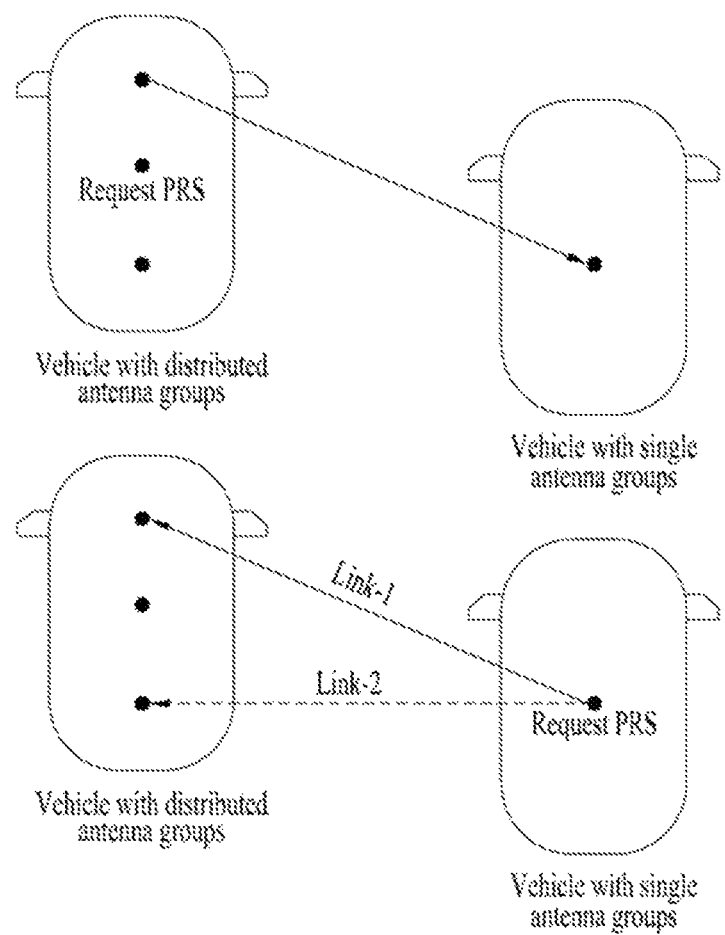
FIG. 15 is a diagram illustrating SL positioning method-1 according to an embodiment.

FIG. 15 is a diagram illustrating SL positioning method-1 according to an embodiment.

As illustrated in FIG. 15, SL positioning method-1 is a method in which a positioning distributed antenna vehicle performs SL positioning with a neighbor single-antenna vehicle using only one antenna group, and a main operation thereof is as follows.

When a PRS transmission resource is insufficient or link quality of a vehicle network is not good according to a channel congestion level, only a small number of antenna groups may participate in relative positioning. In this case, the number of antenna groups participating in positioning may be determined by the location server/LMF and/or the BS or may be determined by the positioning distributed antenna vehicle.

FIG. 15 illustrates an embodiment in which the positioning distributed antenna vehicle transmits a request PRS using only one antenna group, and the neighbor single-antenna vehicle transmits a response PRS in response. In this case, one antenna group in the positioning distributed antenna vehicle may be selected through the following method.

In consideration of the case in which only one antenna group is used in multiple antenna groups, a specific antenna group may be previously designated as a default antenna group. As an embodiment, one antenna group located in the center of a front bumper of a vehicle may be designated as the default antenna group. When the positioning distributed antenna vehicle participates in positioning using only one antenna group, the request PRS may be transmitted and the response PRS may be received through the designated default antenna group.

As another example, one antenna group in multiple antenna groups of the distributed positioning antenna vehicle may be randomly selected by the positioning distributed antenna vehicle.

As another example, one antenna group in multiple antenna groups of the positioning distributed antenna vehicle may be adaptively changed and selected according to link quality between neighbor vehicles participating in SL positioning. For example, when link quality is degraded in a process of periodically or aperiodically performing SL positioning between vehicles, a link is disconnected, or link quality measured with respect to another antenna group is good, the positioning distributed antenna vehicle may change and/or reselect an antenna group participating in positioning. This adaptive antenna group change considering link quality may be importantly considered when a vehicle performs positioning using beamforming. FIG. 15 illustrates a process in which each antenna group of the positioning distributed antenna vehicle measures the quality of each link, e.g., Link-1 and Link-2, by measuring RSRP of the response PRS transmitted by the neighbor single-antenna vehicle.

When the antenna group in the positioning distributed antenna vehicle is reselected by the ego vehicle and/or the network, a request PRS ID transmitted through the changed antenna group may be the same as or different from a request PRS ID transmitted through an antenna group before change.

For example, when the request PRS IDs are the same, the positioning distributed antenna vehicle may continue to perform positioning without notifying the neighbor single-antenna vehicle of changed information.

On the other hand, when the request PRS IDs are different, the positioning distributed antenna vehicle may perform positioning after notifying the neighbor single-antenna vehicle of changed PRS ID information.

The neighbor single-antenna vehicle may report information about a time difference between a time when the response PRS is transmitted and a time when the request PRS is received and information related to positioning and link quality such as AoA, RSRP, and RSSI for the request PRS to the positioning distributed antenna vehicle through data of a PSSCH (or first PSCI of a PSCCH or second PSCI of the PSSCH).

Next, a method of reporting information related to the location of a reference point of a vehicle and the location of an antenna group in consideration of the type of positioning in which the neighbor vehicle is participating will be described.

When the neighbor vehicle participates in absolute positioning, an absolute position of the reference point of the vehicle may be transmitted through the first PSCI of the PSCCH (or the data of the PSSCH or the second PSCI of the PSSCH).

When the neighbor vehicle participates in relative positioning, the neighbor vehicle may report 1) information about a relative position of an antenna group participating in positioning with respect to the location of the reference point or 2) information about a relative position of the reference point with respect to the antenna group participating in positioning to the positioning vehicle. In this case, the relative position of the reference point of the vehicle or the relative position of the antenna group may be transmitted through the second PSCI of the PSSCH (or the data of the PSSCH or the first PSCI of the PSCCH).

The positioning distributed antenna vehicle may perform SL positioning using information about a time difference between a time when the response PRS is received and a time when the request PRS is transmitted, AoA for the response PRS, and information reported by the neighbor single-antenna vehicle.

Figure 16:
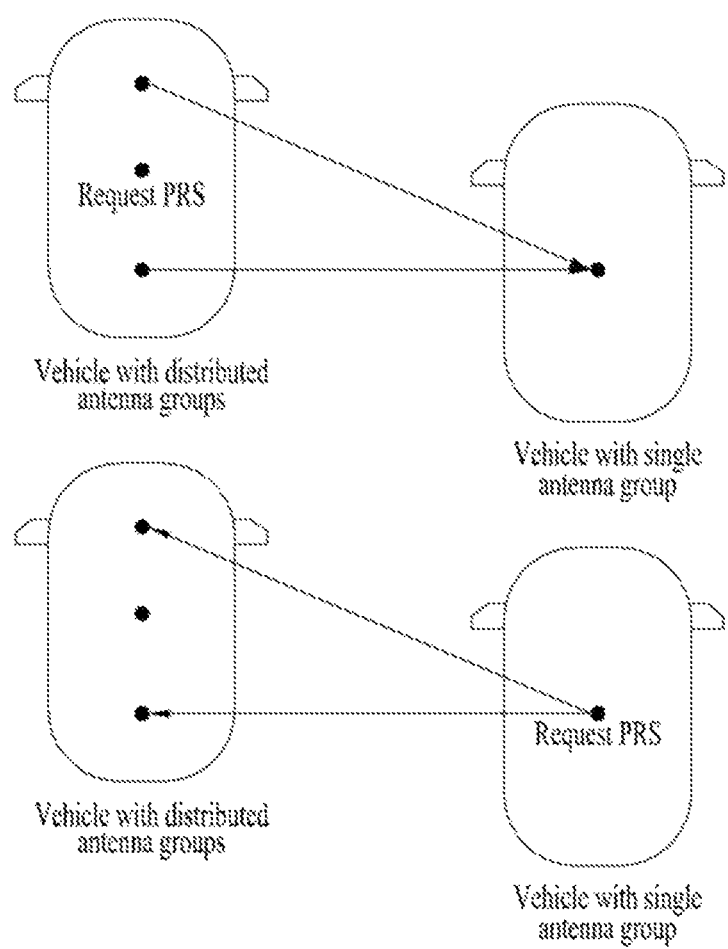
FIG. 16 is a diagram illustrating SL positioning method-2 according to an embodiment.

FIG. 16 is a diagram illustrating SL positioning method-2 according to an embodiment.

SL positioning method-2 is a method in which a positioning distributed antenna vehicle performs relative positioning with a neighbor single-antenna vehicle using two antenna groups, and a main operation thereof is as follows.

When a channel congestion level is low and the link quality of a vehicle network is good or when an LCS in which a vehicle participates demands a relative position of high accuracy, multiple antenna groups may participate in SL positioning. In this case, the number of antenna groups participating in positioning may be determined by the location server/LMF and/or the BS or may be determined by the positioning distributed antenna vehicle.

Referring to FIG. 16, an embodiment is illustrated in which each antenna group of a positioning distributed antenna vehicle transmits a request PRS that may be distinguished by a neighbor single-antenna vehicle, and the neighbor single-antenna vehicle transmits a response PRS in response to the request PRS. In this case, the two request PRSs may have the same or different request PRS IDs and may be transmitted using different time resources and/or frequency resources through time-division multiplexing (TDM) and/or frequency-division multiplexing (FDM) methods, so that the request PRSs may be distinguished by the neighbor single-antenna vehicle. In this case, the time/ frequency resources for transmitting the same or different two request PRSs may be defined by being previously paired.

Information reported to the positioning distributed antenna vehicle by the single-antenna vehicle may be the same or similar to that in SL positioning method-1 described above, and the SL positioning operation performed in the positioning distributed antenna vehicle may be the same as or similar to the SL positioning operation in SL positioning method-1 described above.

Figure 17:
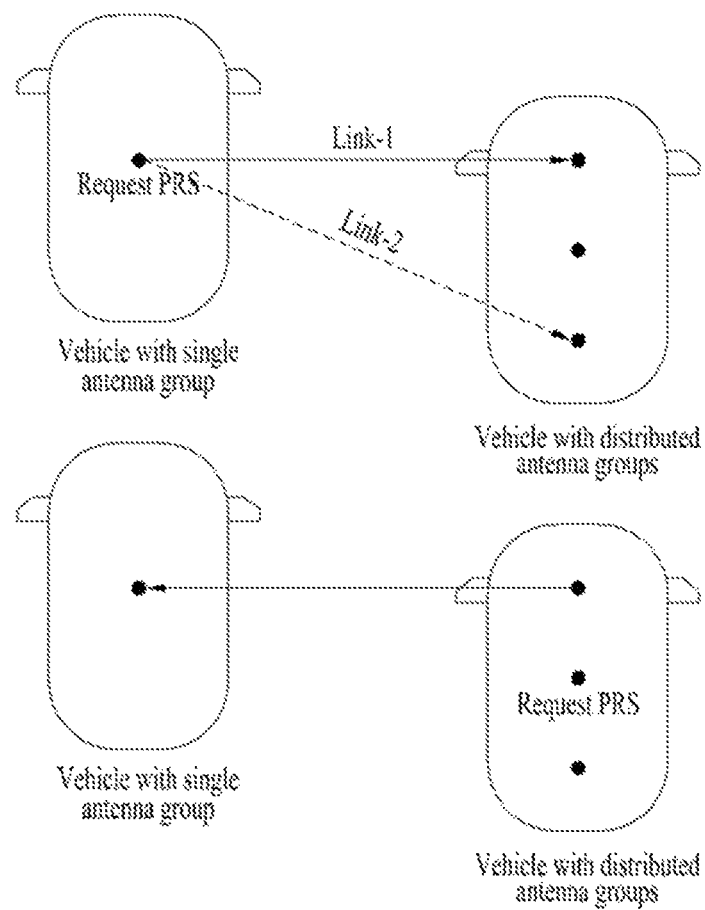
FIG. 17 is a diagram illustrating SL positioning method-3 according to an embodiment.

FIG. 17 is a diagram illustrating SL positioning method-3 according to an embodiment.

SL positioning method-3 is a method in which a positioning single-antenna vehicle performs SL positioning with a neighbor distributed antenna vehicle using only one antenna group, and a main operation thereof is as follows.

The number of antenna groups participating in positioning in the neighbor distributed antenna vehicle may be determined by the location server/LMF and/or the BS according to a channel congestion level, a PRS transmission resource, and link quality of a vehicle network or may be determined by the positioning vehicle or an ego vehicle.

FIG. 17 illustrates an embodiment in which a positioning single-antenna vehicle transmits a request PRS, and a neighbor distributed antenna vehicle transmits a response PRS using only one antenna group in response to the request PRS. In this case, one antenna group participating in positioning in the neighbor distributed antenna vehicle may be selected through the following method.

Similar to SL positioning method-1 described above, a specific antenna group may be previously designated as a default antenna group in consideration of the case in which only one antenna group in multiple antenna groups is used. Alternatively, one antenna group in the multiple antenna groups may be randomly selected by a corresponding vehicle.

Alternatively, one antenna group in the multiple antenna groups may be adaptively selected according to link quality between vehicles participating in SL positioning. For example, when link quality is degraded in a process of periodically or aperiodically performing SL positioning between vehicles, a link is disconnected, or link quality measured in another antenna group is good, an antenna group participating in positioning may be changed. In this case, antenna group reselection may be finally determined by the positioning vehicle, the network, or the neighbor vehicle.

When change of an antenna group for the neighbor distributed antenna vehicle is determined by the neighbor distributed antenna vehicle, a response PRS ID transmitted through the antenna group after change may be the same as or different from a response PRS ID transmitted through an antenna group before change. As an example, the neighbor distributed antenna vehicle may use dynamically selected equal or different response PRS IDs according to whether an available response PRS ID is present.

When the response PRS IDs are the same, the neighbor distributed antenna vehicle may continue to perform positioning without notifying the positioning single-antenna vehicle of changed information.

On the other hand, when the response PRS IDs are different, the neighbor distributed antenna vehicle may perform positioning after notifying the positioning single-antenna vehicle of the changed information.

Information reported to the positioning distributed antenna vehicle by the neighbor single-antenna vehicle may be the same as or similar to SL positioning method-1 described above. In addition, the SL positioning operation performed in the positioning distributed antenna vehicle may be the same as or similar to the SL positioning operation in SL positioning method-1.

Figure 18:
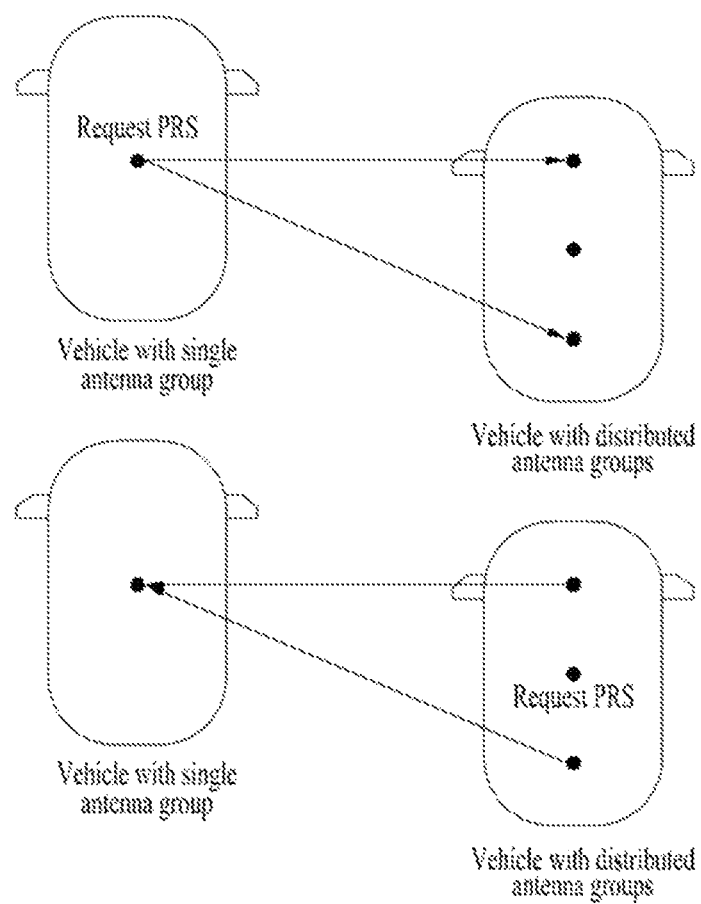
FIG. 18 is a diagram illustrating SL positioning method-4 according to an embodiment.

FIG. 18 is a diagram illustrating SL positioning method-4 according to an embodiment.

SL positioning method-4 is a method in which a positioning single-antenna vehicle performs SL positioning with a neighbor distributed antenna vehicle using two antenna groups, and a main operation thereof is as follows.

Referring to FIG. 18, an embodiment is illustrated in which a positioning single-antenna vehicle transmits a request PRS and a neighbor distributed antenna vehicle transmits different response PRSs that may be distinguished by the positioning single-antenna vehicle. In this case, the two response PRSs may have the same or different response PRS IDs. In addition, the two response PRSs may be transmitted using different time resources and frequency resources, so that the response PRSs may be distinguished by the positioning single-antenna vehicle. In this case, the time/frequency resources for transmitting the same or different two response PRSs may be defined by being previously paired.

The present disclosure according to the above-described embodiments may provide fast link connection between a positioning vehicle and a neighbor vehicle by performing SL positioning through a non-negotiation method between vehicles and may be effectively applied to a distributed network environment in which the movement speed of a vehicle is fast.

In addition, the present disclosure according to the above-described embodiments has the advantage of rapidly improving the link quality of a vehicle network without affecting SL positioning which is being performed by changing an antenna group using the same request/response ID.

In addition, the present disclosure according to the above-described embodiments may improve efficiency and flexibility of an SL positioning operation between distributed antenna vehicles by providing an adaptive antenna group selection and antenna group change method in consideration of a channel congestion level, a PRS resource status, and link quality of a vehicle network in a distributed antenna vehicle using a plurality of antenna groups.

In addition, the present disclosure according to the above-described embodiments may minimize the cost of infrastructure installation for positioning by providing an absolute positioning method using a relative position for SL positioning between distributed antenna vehicles.

Figure 19:
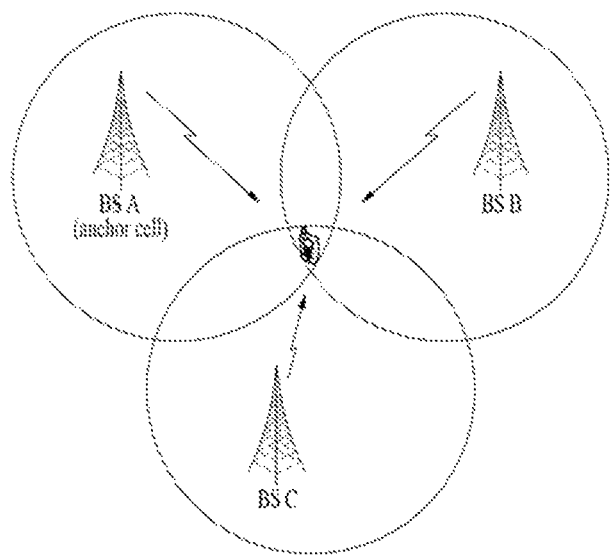
FIG. 19 is a diagram illustrating an observed time difference of arrival (OTDOA) positioning method to which the present disclosure is applicable.

FIG. 19 is a diagram illustrating an OTDOA positioning method according to an embodiment of the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell, respectively. That is, the RSTD may be calculated based on a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

where c is the speed of light, {xt, yt} is the (unknown) coordinates of the target UE, {xi, yi} is the coordinates of a (known) TP, and {x1, y1} is the coordinates of a reference TP (or another TP). (Ti−T1) is a transmission time offset between the two TPs, which may be referred to as "real time difference" (RTD), and ni and n1 may represent values related to UE TOA measurement errors.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
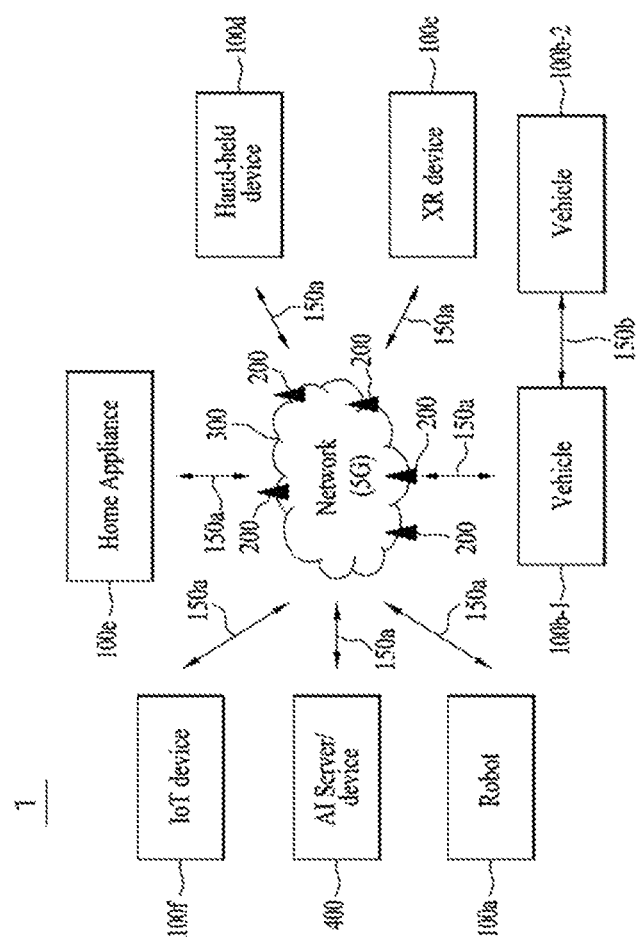
FIG. 20 illustrates a communication system applied to the present disclosure.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 21:
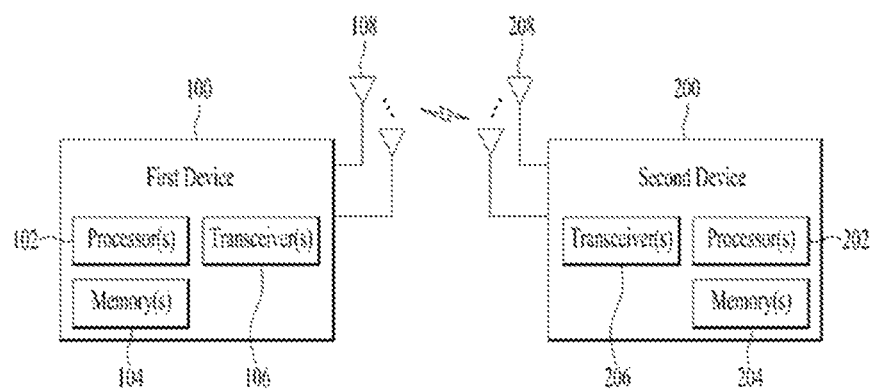
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100, the second wireless device 200} may correspond to {the wireless device 100x, the base station 200} and/or {the wireless device 100x, the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

In detail, the UE or the vehicle may include the processor 102 and the memory 104 that are connected to the RF transceiver. The memory 104 may contain at least one program for performing an operation related to the embodiments described with reference to FIGS. 12 to 18.

The processor 102 may select a neighbor vehicle to participate in positioning by performing a preliminary operation for SL positioning, exchange SCI for positioning with the selected neighbor vehicle, reselect an antenna group to participate in positioning based on a signal received from the selected neighbor vehicle, and perform positioning using the reselected antenna group. The processor 102 may perform the operation for determining the absolute position of the UE according to embodiments for performing positioning based on the UE or the network in the sidelink V2X system described with reference to FIGS. 12 to 18 based on the program contained in the memory 104.

A chip set including the processor 102 and the memory 104 may be configured. In this case, the chip set may include at least one processor and at least one memory operatively connected to the at least one processor and allowing the at least one processor to perform an operation when being executed, and the operation may include selecting a neighbor vehicle to participate in positioning by performing a preliminary operation for sidelink positioning, exchanging sidelink control information for positioning with the selected neighbor vehicle, reselecting an antenna group to participate in positioning based on a signal received from the selected neighbor vehicle, and performing positioning using the reselected antenna group. The processor 102 may perform the operation for determining the absolute position of the UE according to embodiments for performing sidelink positioning using distributed antennas described with reference to FIGS. 12 to 18 based on the program contained in the memory 104.

A computer readable recording medium including at least computer program for allowing the at least one processor to perform an operation may be provided, and the operation may include selecting a neighbor vehicle to participate in positioning by performing a preliminary operation for sidelink positioning, exchanging sidelink control information for positioning with the selected neighbor vehicle, reselecting an antenna group to participate in positioning based on a signal received from the selected neighbor vehicle, and performing positioning using the reselected antenna group. The processor 102 may perform the operation for determining the absolute position of the UE according to embodiments for performing positioning based on the UE or the network in the sidelink V2X system described with reference to FIGS. 12 to 18 based on the program contained in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may select a neighbor vehicle to participate in positioning by performing a preliminary operation for SL positioning, exchange SCI for positioning with the selected neighbor vehicle, reselect an antenna group to participate in positioning based on a signal received from the selected neighbor vehicle, and perform positioning using the reselected antenna group. The processor 202 may perform the operation for determining the absolute position of the UE according to embodiments for performing positioning based on the UE or the network in the sidelink V2X system described with reference to FIGS. 12 to 18 based on the program contained in the memory 204.

A chip set including the processor 202 and the memory 204 may be configured. In this case, the chip set may include at least one processor and at least one memory operatively connected to the at least one processor and allowing the at least one processor to perform an operation when being executed, and the operation may include selecting a neighbor vehicle to participate in positioning by performing a preliminary operation for sidelink positioning, exchanging sidelink control information for positioning with the selected neighbor vehicle, reselecting an antenna group to participate in positioning based on a signal received from the selected neighbor vehicle, and performing positioning using the reselected antenna group. The processor 202 may perform the operation for determining the absolute position of the UE according to embodiments for performing positioning based on the UE or the network in the sidelink V2X system described with reference to FIGS. 12 to 18 based on the program contained in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Application of Wireless Device Applicable to the Present Disclosure

Figure 22:
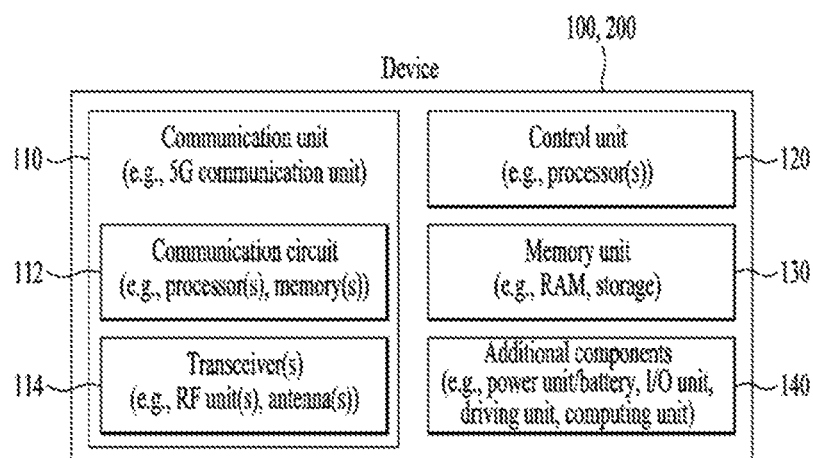
FIG. 22 illustrates another example of a wireless device applicable to the present disclosure.

FIG. 22 illustrates another example of a wireless device applied to the present disclosure. The wireless device may be implemented in various forms according to a use-case/service (refer to FIG. 20).

Referring to FIG. 22 wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 25), the IoT device (100f of FIG. 20), a digital broadcast terminal, a hologram device, a public safety device, an MTC device, a medicine device, a FinTech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 23:
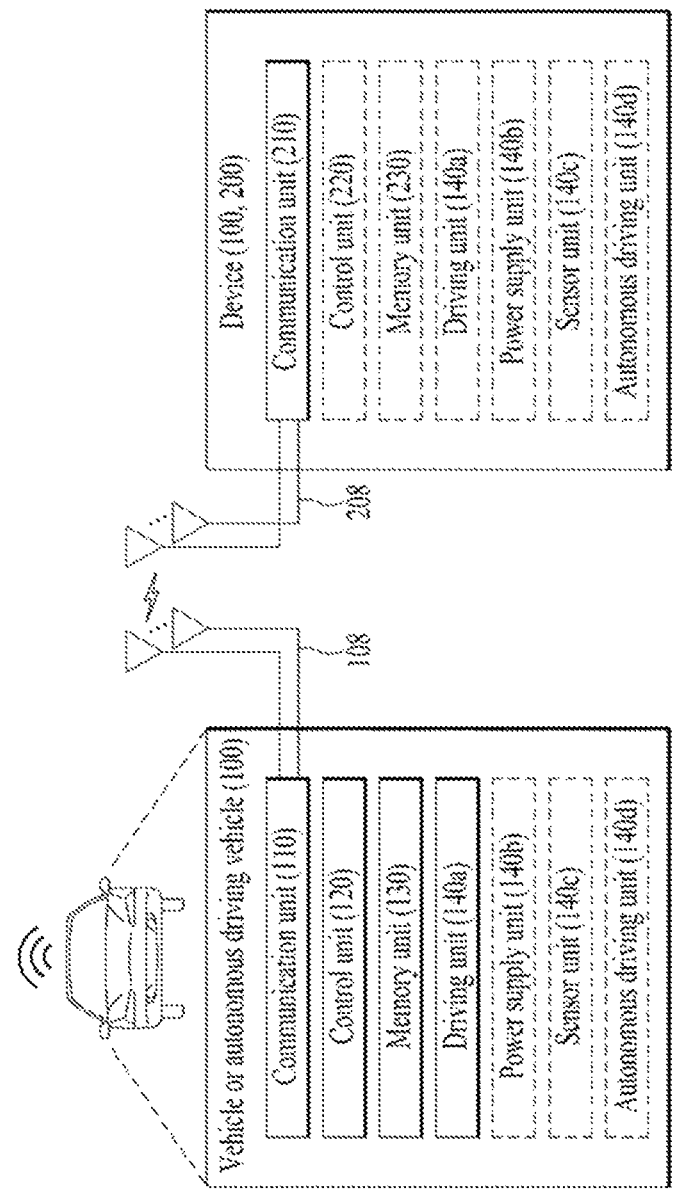
FIG. 23 illustrates a vehicle or an autonomous driving vehicle applied to the present disclosure.

Example of a Vehicle or an Autonomous Driving Vehicle to which the Present Disclosure is Applied FIG. 23 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 23, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 22, respectively.

The antenna unit 108 may include a plurality of distributed antennas distributed and arranged in the vehicle. The position of the distributed antennas arranged in the vehicle may be different depending on the vehicle. A reference point indicating a relative position in the vehicle of the distributed antenna may be predefined and may be recorded and maintained in a memory included in the vehicle. In this case, the reference point may be differently defined according to the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, a wireless communication technology implemented in the wireless devices XXX and YYY in the present disclosure may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name Additionally or alternatively, the wireless communication technology implemented in the wireless devices XXX and YYY may be performed based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT (LTE Category) 0, 2) LTE Cat M1, 3) LTE Cat M2, 4) LTE non-BL(non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless devices XXX and YYY according to the present disclosure may include at least one of ZigBee, Bluetooth, or Low Power Wide Area Network (LPWAN) in consideration of low power communication and is not limited to the aforementioned terms. For example, the ZigBee technology may generate personal area networks (PAN) associated with small/low-power digital communication based on various The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

In this document, the embodiments of the present disclosure have been described centering on a data transmission and reception relationship between a UE and a BS. The transmission and reception relationship may be equally/similarly extended to signal transmission/reception between a UE and a relay or between a BS and a relay. In this document, a specific operation described as performed by the BS may be performed by an upper node of the BS as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a UE, a mobile station (MS), or a mobile subscriber station (MSS).

The embodiments according to the present disclosure may be implemented by various means, for example, hardware, firmware, software, or a combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Various embodiments of the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various devices and wireless communication systems.

The invention claimed is:
1. A positioning method in a user equipment (UE) of a positioning vehicle equipped with multiple antenna groups, the method comprising:
selecting a neighbor vehicle which is to participate in positioning;
exchanging control information for positioning with the selected neighbor vehicle;
reselecting, from among the multiple antenna groups, an antenna group which is to participate in positioning based on a signal received from the selected neighbor vehicle; and
performing positioning using the reselected antenna group,
wherein the reselecting the antenna group further comprises:
calculating a congestion level of channel resource use based on the number of neighbor vehicles which are participating in positioning; and
determining whether to reselect the antenna group based on the calculated congestion level and positioning performance demanded by a higher layer.
2. The method of claim 1, wherein the reselecting the antenna group comprises:
transmitting a request positioning reference signal (PRS) by selecting a request PRS identification (ID);
receiving a response PRS in response to the request PRS;
measuring signal quality of the received response PRS; and reselecting the antenna group which is to participate in positioning based on the measured signal quality.

3. The method of claim 2, wherein the reselecting the antenna group further comprises:
measuring an angle of arrival (AoA) using the response PRS, and
wherein the reselected antenna group is reselected based further on the measured AoA.

4. The method of claim 3, wherein positioning topology between the positioning vehicle and the neighbor vehicle is determined based on the measured AoA, and the reselected antenna group is reselected based on the determined positioning topology.

5. The method of claim 3, further comprising:
requesting the neighbor vehicle to reselect an antenna group of the neighbor vehicle which is to participate in positioning, based on degradation or non-degradation of positioning performance according to the AoA.

6. The method of claim 2, wherein the reselecting the antenna group further comprises:
measuring link quality of the multiple antenna groups based on the response PRS received from the neighbor vehicle;
comparing the link quality of the multiple antenna groups with a predetermined threshold; and
adjusting the number of antenna groups of the positioning vehicle which are to participate in positioning according to a result of the comparison.

7. The method of claim 2, further comprising:
receiving a measurement reporting signal from the selected neighbor vehicle,
wherein the reselected antenna group is reselected based further on the measurement reporting signal, and
wherein the measurement reporting signal includes at least one of information about a time difference between a reception time of the request PRS and a transmission time of the response PRS for each antenna group participating in positioning of the neighbor vehicle, information about an angle of arrival (AoA) corresponding to the request PRS, or information about link quality corresponding to the request PRS.

8. The method of claim 1, wherein the reselecting the antenna group comprises:
receiving a signal requesting reselection of the antenna group from the neighbor vehicle,
wherein the reselecting the antenna group is performed based on the signal requesting reselection.

9. The method of claim 1, further comprising:
transmitting a result of the reselection of the antenna group of the positioning vehicle to the neighbor vehicle; and
receiving information about an antenna group of the neighbor vehicle reselected by the neighbor vehicle from the neighbor vehicle.

10. An apparatus of a positioning vehicle for performing positioning in a wireless communication system, the apparatus comprising:
a radio frequency (RF) transceiver including multiple antenna groups;
a processor connected to the RF transceiver; and
a memory storing instructions that cause the processor to perform operations comprising:
selecting a neighbor vehicle which is to participate in positioning;
exchanging control information for positioning with the selected neighbor vehicle;
reselecting, from among the multiple antenna groups, an antenna group which is to participate in positioning based on a signal received from the selected neighbor vehicle; and
performing positioning using the reselected antenna group,
wherein the reselecting the antenna group further comprises:
calculating a congestion level of channel resource use based on the number of neighbor vehicles which are participating in positioning; and
determining whether to reselect the antenna group based on the calculated congestion level and positioning performance demanded by a higher layer.

11. The apparatus of claim 10, wherein the reselecting the antenna group comprises: transmitting a request positioning reference signal (PRS) by selecting a request PRS identification (ID), receiving a response PRS in response to the request PRS, measuring signal quality of the received response PRS, and reselecting the antenna group which is to participate in positioning based on the measured signal quality.

12. The apparatus of claim 11, wherein the reselecting the antenna group comprises: measuring an angle of arrival (AoA) using the received response PRS, and wherein the reselected antenna group is reselected based further on the measured AoA.

13. The apparatus of claim 12, wherein the operations further comprise: determining positioning topology between the positioning vehicle and the neighbor vehicle based on the measured AoA, and wherein the reselected antenna group is reselected based on the determined positioning topology.

14. The apparatus of claim 12, wherein, based on degradation or non-degradation of positioning performance according to the determined AoA, the operations further comprise: requesting the neighbor vehicle to reselect an antenna group of the neighbor vehicle which is to participate in positioning.

15. The apparatus of claim 11, wherein the operations further comprise: measuring link quality of the multiple antenna groups based on the signal received from the neighbor vehicle, comparing the link quality of the multiple antenna groups with a predetermined threshold, and adjusting the number of antenna groups which are to participate in positioning according to a result of the comparison.

16. The apparatus of claim 11, wherein the operations further comprise:
reselecting, based on reception of a measurement reporting signal from the selected neighbor vehicle, the antenna group which is to participate in positioning based further on the measurement reporting signal, and
wherein the measurement reporting signal includes at least one of information about a time difference between a reception time of the request PRS and a transmission time of the response PRS for each antenna group participating in positioning of the neighbor vehicle, information about an angle of arrival (AoA) corresponding to the request PRS, or information about link quality corresponding to the request PRS.

17. The apparatus of claim 10, wherein the reselecting the antenna group is performed based on reception of a signal requesting reselection of the antenna group from the neighbor vehicle.

18. The apparatus of claim 10, wherein the operations further comprise: transmitting a result of the reselection of the antenna group of the positioning vehicle to the neighbor vehicle, and receiving information about an antenna group of the neighbor vehicle reselected by the neighbor vehicle from the neighbor vehicle.

\* \* \* \* \*